(12) United States Patent  
Hattori et al.

(10) Patent No.: US 11,853,844 B2
(45) Date of Patent: Dec. 26, 2023

(54) INFORMATION PROCESSING APPARATUS, IMAGE ORIENTATION DETERMINATION METHOD, AND MEDIUM

(71) Applicant: PFU LIMITED, Kahoku (JP)

(72) Inventors: Katsuhiro Hattori, Kahoku (JP); Tomoaki Wada, Kahoku (JP); Ken Yanai, Kahoku (JP)

(73) Assignee: PFU LIMITED, Kahoku (JP)

( * ) Notice: Subject to any disclaimer, the term of this patent is extended or adjusted under 35 U.S.C. 154(b) by 308 days.

(21) Appl. No.: 17/230,287

(22) Filed: Apr. 14, 2021

(65) Prior Publication Data

US 2021/0335006 A1 Oct. 28, 2021

(30) Foreign Application Priority Data

Apr. 28, 2020 (JP) ................................. 2020-078785

(51) Int. Cl.
| | | |
|---|---|---|
| *G06V 10/60* | (2022.01) | |
| *G06K 7/14* | (2006.01) | |
| *G06T 7/73* | (2017.01) | |
| *G06T 3/60* | (2006.01) | |
| *G06T 7/33* | (2017.01) | |
| *G06T 3/40* | (2006.01) | |

(Continued)

(52) U.S. Cl.
CPC .............. *G06K 7/1447* (2013.01); *G06T 3/40* (2013.01); *G06T 3/60* (2013.01); *G06T 5/50* (2013.01); *G06T 7/337* (2017.01); *G06T 7/70* (2017.01); *G06T 7/74* (2017.01); *G06T 2207/20081* (2013.01); *G06T 2207/20104* (2013.01); *G06T 2207/30176* (2013.01)

(58) Field of Classification Search
CPC ......... F16L 55/26; H04N 5/235; G06T 7/187; G06T 7/0002; G06T 11/60; G06T 7/74; G06T 3/60; G06T 7/337; G06T 4/40

See application file for complete search history.

(56) References Cited

U.S. PATENT DOCUMENTS 6,798,905 B1   9/2004   Sugiura et al.
9,373,031 B2   6/2016   Ghessassi
(Continued)

FOREIGN PATENT DOCUMENTS

JP   2000-32247 A    1/2000
JP   2010-262578 A   11/2010
(Continued)

OTHER PUBLICATIONS

Non-Final Office Action dated Apr. 11, 2023, issued in U.S. Appl. No. 17/240,279. (49 pages).
Related co-pending U.S. Appl. No. 17/240,279.

*Primary Examiner* — Phuoc H Doan
(74) *Attorney, Agent, or Firm* — WHDA, LLP

(57) ABSTRACT

An information processing apparatus includes a processor to store a determination feature in a predetermined partial area in an image having a predetermined format and a position of the partial area in a state in which the predetermined format image is erect, and determine whether a feature corresponding to the determination feature is present at a position in an at least one input determination target image corresponding to the position of the partial area in the predetermined format image to thereby determine whether the determination target image is erect.

18 Claims, 16 Drawing Sheets

(51) Int. Cl.
    *G06T 7/70*          (2017.01)
    *G06T 5/50*          (2006.01)

(56) References Cited

U.S. PATENT DOCUMENTS

| | | |
|---|---|---|
| 10,616,443 B1 | 4/2020 | Lund |
| 10,867,171 B1 | 12/2020 | Contryman et al. |
| 11,610,066 B2 | 3/2023 | Downs et al. |
| 2003/0099395 A1 | 5/2003 | Wang et al. |
| 2007/0071359 A1 | 3/2007 | Yumoto et al. |
| 2007/0168382 A1 | 7/2007 | Tillbery et al. |
| 2009/0164894 A1* | 6/2009 | Takekawa .......... H04N 1/00466 715/274 |
| 2009/0297038 A1 | 12/2009 | Ishikawa et al. |
| 2009/0316235 A1 | 12/2009 | Morimoto |
| 2012/0038941 A1 | 2/2012 | Megawa |
| 2013/0148863 A1 | 6/2013 | Muraishi |
| 2017/0220545 A1 | 8/2017 | Gururajan et al. |
| 2021/0240978 A1 | 8/2021 | Steeves et al. |

FOREIGN PATENT DOCUMENTS

| | | |
|---|---|---|
| JP | 2014-134963 A | 7/2014 |
| WO | 2007/142227 A1 | 12/2007 |

\* cited by examiner

AREA SPECIFIED BY USER

FIG. 11

| DETERMINATION TARGET IMAGE No. | APPLICATION ORDER | MATCHING RESULT |
|---|---|---|
| 1 | A⇒B⇒C⇒D | NO |
| 2 | A⇒B⇒C⇒D | C |
| 3 | C⇒A⇒B⇒D | B |
| 4 | B⇒C⇒A⇒D | B |
| 5 | B⇒C⇒A⇒D | B |
| 6 | B⇒C⇒A⇒D | B |

FIG. 14

INFORMATION PROCESSING APPARATUS, IMAGE ORIENTATION DETERMINATION METHOD, AND MEDIUM

CROSS-REFERENCE TO RELATED APPLICATION

This application is based upon and claims the benefit of priority of the prior Japanese Patent Application No. JP2020-078785, filed on Apr. 28, 2020, the entire contents of which are incorporated herein by reference.

FIELD

The present disclosure relates to a technique for determining the orientation of an image.

BACKGROUND

Conventionally, there is proposed a method for determining a vertical direction of an input image more accurately without incorporating a special equipment for detecting an inclination in an image acquisition apparatus. In the method, an object candidate detection means detects object candidates from the input image and their angles in the input image, a similarity degree calculation means calculates the degree of similarity between each detected object candidate and each pre-stored object, an input image angle calculation means determines the vertical direction of the input image based on the calculated degree of similarity of each object candidate and the angle in the input image, and, for example, the input image angle calculation means carries out weighting for the angle of each object candidate in the input image based on the degree of similarity, and calculates an inclination angle with respect to the vertical direction of the input image by using the weighted angle (see WO 2007/142227).

In addition, conventionally, there is proposed a method which includes an extraction section which extracts, from a plurality of first images each including orientation information indicative of a vertical direction of an image, a group of feature points which are included in common in at least two of the plurality of first images, a detection section which detects, from the group of feature points extracted in the extraction section, a group of feature points which are distributed in a specific positional relationship with respect to the vertical direction in at least two first images, a retrieval section which retrieves the group of feature points detected in the detection section in a second image which does not have the orientation information, and a determination section which determines the orientation of the second image based on a comparison between a positional relationship of the group of feature points found by the retrieval section and a specific positional relationship corresponding to the group of feature points (see Japanese Patent Application Publication No. 2014-134963).

SUMMARY

An example of the present disclosure is an information processing apparatus including a processor to store a determination feature in a predetermined partial area in an image having a predetermined format and a position of the partial area in a state in which the predetermined format image is erect, and determine whether a feature corresponding to the determination feature is present at a position in an at least one input determination target image corresponding to the position of the partial area in the predetermined format image to thereby determine whether the determination target image is erect.

The present disclosure can be understood as an information processing apparatus, a system, a method which is executed by a computer, or a program which a computer is caused to execute.

In addition, the present disclosure can also be understood as a non-transitory computer-readable recording medium which can be read by a computer, a device, a machine or the like, which records such a program.

Here the recording medium, which can be read by a computer or the like, is a recording medium which stores information such as data and programs by an electric, magnetic, optical, mechanical, or chemical function, and which can be read by a computer and the like.

BRIEF DESCRIPTION OF THE DRAWINGS

FIG. 11 is a diagram showing an example in which the order of the feature area used for the erectness determination processing is changed according to the embodiment;

FIG. 14 is a schematic diagram showing an example of a registration screen for determining the feature area according to the embodiment;

DESCRIPTION OF EMBODIMENTS

Hereinbelow, embodiments of an information processing apparatus, an image orientation determination method, and a program according to the present disclosure will be described with reference to the drawings.

The following embodiments, however, are examples and are not intended to limit the information processing apparatus, the image orientation determination method, and the program according to the present disclosure to the specific configurations described below.

In implementation, specific configurations corresponding to the mode of implementation may be appropriately adopted, and various improvements and modifications may be made.

In these embodiments, a case when the information processing apparatus, the image orientation determination method, and the program according to the present disclosure are implemented in a system in which the orientation of an image of a scanned form is determined, will be described. Note that the information processing apparatus, the image orientation determination method, and the program according to the present disclosure can be widely used in a technique for determining the orientation of a captured image, and an application target of the present disclosure is not limited to the examples described in these embodiments.

System Configuration

Figure 1:
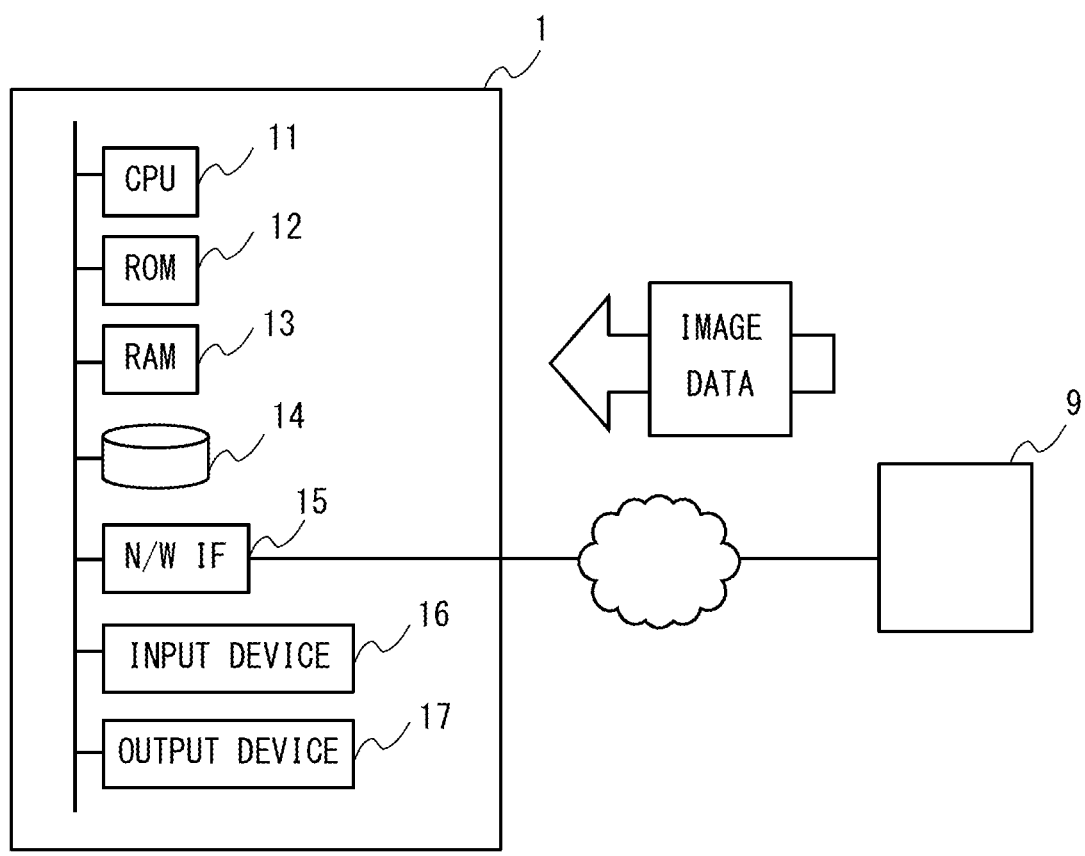
FIG. 1 is a schematic diagram showing a configuration of a system according to an embodiment.

FIG. 1 is a diagram showing the outline of the configuration of a system according to the present embodiment. The system according to the present embodiment includes an information processing apparatus 1 and an image acquisition apparatus 9 which are able to communicate with each other by being connected to a network.

The information processing apparatus 1 is a computer which includes a central processing unit (CPU) 11, a read only memory (ROM) 12, a random access memory (RAM) 13, a storage device 14 such as an electrically erasable and programmable read only memory (EEPROM) or a hard disk drive (HDD), a communication unit such as a network interface card (NIC) 15, an input device 16 such as a keyboard or a mouse, and an output device 17 such as a display. Note that the specific hardware configuration of the information processing apparatus 1 appropriately allows omission, replacement, or addition in accordance with the mode of implementation. In addition, the information processing apparatus 1 is not limited to an apparatus having a single cabinet. The information processing apparatus 1 may be implemented by a plurality of apparatuses which use a technique of what is called a cloud or distributed computing.

The image acquisition apparatus 9 is an apparatus which acquires an image, and examples of the image acquisition apparatus 9 include a scanner or a multifunction machine which acquires a document image by reading a document such as a form, and an imaging apparatus such as a digital camera or a smartphone which captures the image of a person or scenery.

Figure 2:
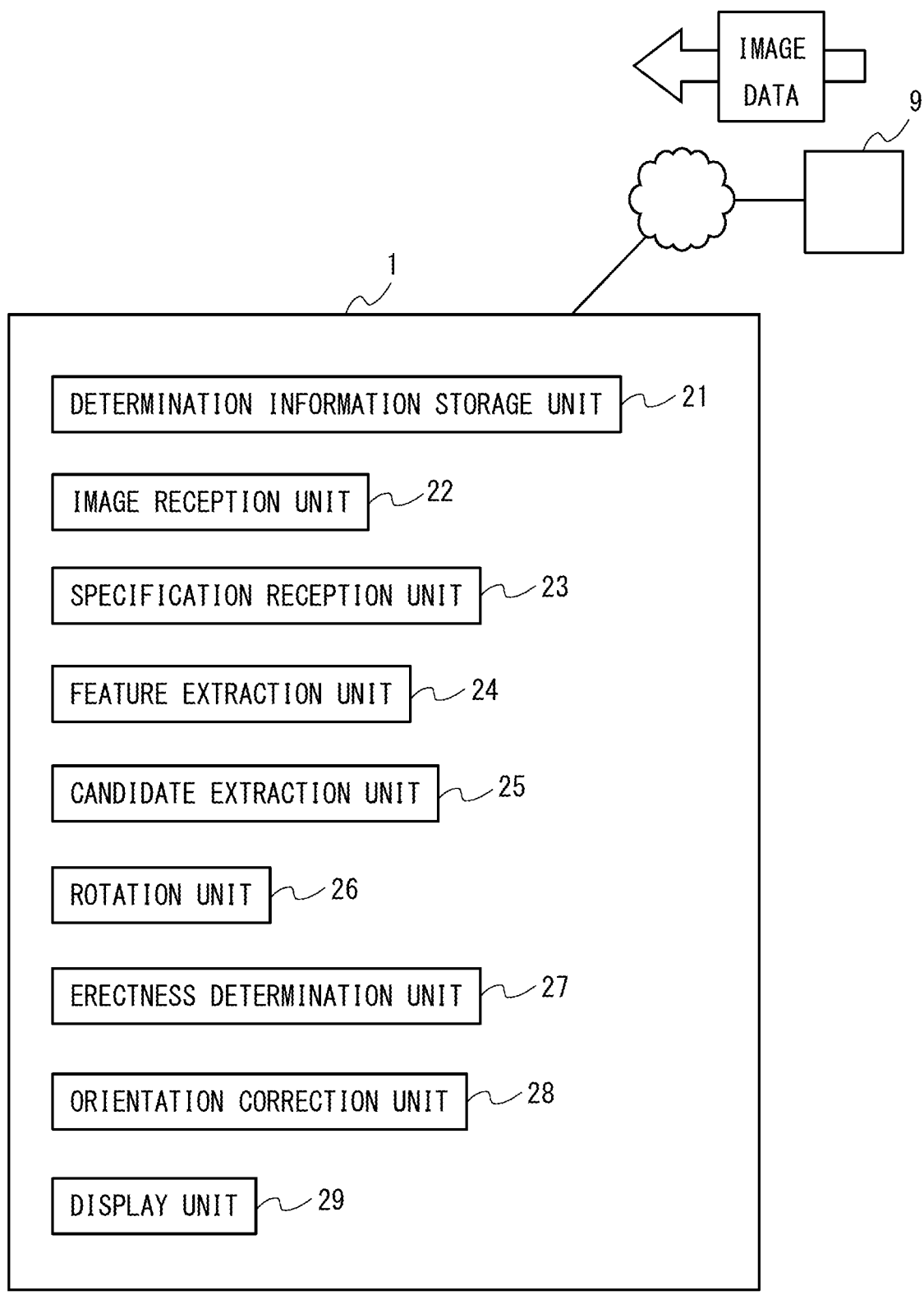
FIG. 2 is a diagram showing an outline of a functional configuration of an information processing apparatus according to the embodiment.

FIG. 2 is a diagram showing an outline of a functional configuration of the information processing apparatus 1 according to the present embodiment. In the information processing apparatus 1, a program recorded in the storage device 14 is read into the RAM 13 and executed by the CPU 11 and each hardware provided in the information processing apparatus 1 is controlled, and the information processing apparatus 1 thereby functions as the information processing apparatus which includes a determination information storage unit (determination information database) 21, an image reception unit 22, a specification reception unit 23, a feature extraction unit 24, a candidate extraction unit 25, a rotation unit 26, an erectness determination unit 27, an orientation correction unit 28, and a display unit 29. Note that, in the present embodiment and another embodiment described later, the individual functions of the information processing apparatus 1 are executed by the CPU 11 serving as a multi-purpose processor, and part or all of the functions may also be executed by one or a plurality of dedicated processors.

The information processing apparatus 1 according to the present embodiment is implemented on, e.g., a cloud, receives a learning image having a predetermined format from the image acquisition apparatus 9 to thereby learn information (a determination feature in a feature area and a position of the feature area in an erect state) for determining the orientation of the image having the predetermined format, and stores the information in the determination information database 21. Subsequently, when the information processing apparatus 1 receives a determination target image (an image on which an erectness determination is to be performed) from the image acquisition apparatus 9, the information processing apparatus 1 determines whether the determination target image is erect by determining whether a feature corresponding to the determination feature is present at the position corresponding to the feature area in the determination target image.

The determination information storage unit (determination information database) 21 stores (registers) the information (determination information) for determining the orientation of the image having the predetermined format (predetermined format image). The predetermined format image is an image having a predetermined image at a predetermined position in an erect state, and includes, e.g., an image of a document having a predetermined format such as a form or other captured images (camera images or the like). In the present embodiment, the determination information storage unit 21 stores the determination feature in the feature area (an area having a feature) which is a predetermined partial area in the predetermined format image, and the position of the feature area in a state in which the predetermined format image is erect. Specifically, when the feature area is specified in the learning image having the predetermined format, the determination information storage unit 21 stores the determination feature in the specified feature area and the position of the feature area in a state in which the learning image is erect as the determination feature and the position for the image having the predetermined format.

For example, an area including a corporate name or logo, a document title, or a caution is selected as the feature area, and information for determining similarity between an image included in the area and a comparison target image such as image data, a feature point, or a feature amount in the feature area is stored as the determination feature. The determination information storage unit 21 stores the determination feature in one or a plurality of predetermined format images. In addition, in the present embodiment, while one feature area is registered for one predetermined format image, the feature area is not limited thereto, and a plurality of feature areas may also be registered for one predetermined format image.

In addition, the determination information storage unit 21 may use an area (extended area) obtained by adding a surrounding area to an area specified (selected) by a user as the feature area and store the determination feature. In the present embodiment, the feature area is determined by selection of the area in the learning image by the user. However, depending on an extraction method of the feature point, there are cases where the feature point cannot be extracted in predetermined bounds inside the edge of the selected area. Accordingly, in the present embodiment, the extended area is used as the feature area such that the feature points in the entire area specified by the user are detected. Note that the feature area is not limited to the extended area, and the area specified by the user itself may be used as the feature area.

In the case where the surrounding area goes beyond the edge of the predetermined format image, i.e., in the case where, when the area is extended, the extended area reaches the outside of the edge of a manuscript, the determination information storage unit 21 may add a margin area corresponding to a portion beyond the edge as the surrounding area, and store the determination feature.

Figure 3:
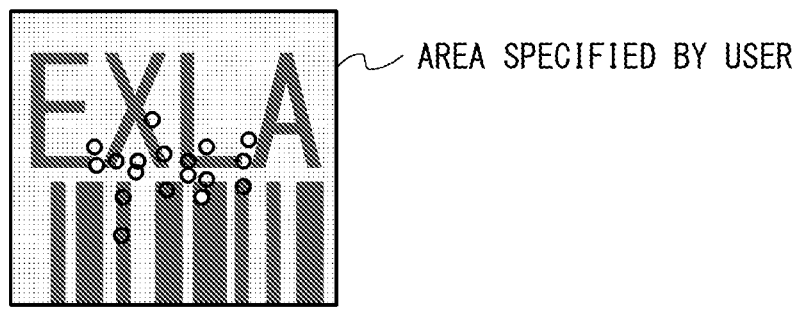
FIG. 3 is a diagram showing an example of a feature area before extension according to the embodiment.

FIG. 3 is a diagram showing an example of the feature area before the extension according to the present embodiment. As shown in FIG. 3, in the feature area before the extension, there are cases where the feature point at the edge portion such as the upper portion of a character is not detected. Therefore, in the present embodiment, for example, an area obtained by extending each of the upper, lower, left, and right sides of the area specified by the user by a predetermined width X px (e.g., 30 px) is used as the feature area.

Figure 4:
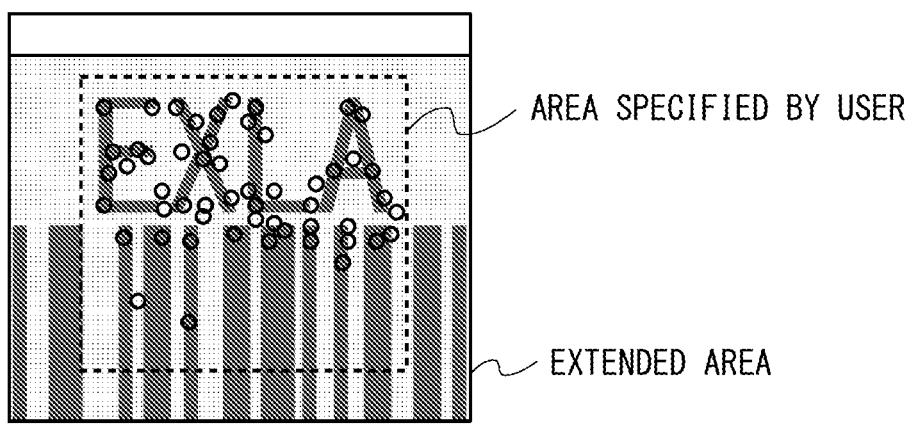
FIG. 4 is a diagram showing an example of the feature area after the extension according to the embodiment.

FIG. 4 is a diagram showing an example of the feature area after the extension according to the present embodiment. As shown in FIG. 4, in the feature area after the extension, it becomes possible to detect the feature points in the entire area (all characters) specified by the user.

Note that, in the example in FIG. 4, the area specified by the user is an area in the uppermost portion of the manuscript and the surrounding area position above the specified area goes beyond the edge of the image, and hence the margin area is added as the surrounding area. In addition, in this case, by setting the width of the margin area added from the edge of the manuscript to a width (e.g., 15 px) which is less than the width (X px) of the surrounding area to be added, an adjustment may be made such that a black area (an area of a black thick line (belt), or a black U-shaped or L-shape area) in the edge portion of the manuscript is not detected as the feature point. For example, in FIG. 4, the area in the uppermost portion of the manuscript is specified by the user. As a result, the margin area (surrounding area) having a width of 15 px is additionally provided on the upper side of the specified area, and the surrounding area having a width of 30 px is additionally provided on each of the lower, right, and left sides thereof.

In addition, the determination information storage unit 21 may store the determination feature at a resolution adjusted in accordance with the size of the feature area. At a worksite where a large amount of scanning is performed, it is necessary to quickly complete scan processing including the erectness determination of the images. However, in the case where the size of the feature area to be registered is large, the amount of data related to the determination feature used in the erectness determination is increased, and hence it may take time to perform the erectness determination (scan processing). To cope with this, in the present embodiment, the determination feature is stored at the resolution which is adjusted in accordance with the size of the feature area such that a reduction in processing speed is prevented while the feature point and the feature amount in the feature area are extracted. In this case, the resolution is adjusted so as to reduce as the size of the feature area increases.

For example, the determination feature is stored at a predetermined resolution (e.g., 300 dpi) for a feature area having a small size of, e.g., 0.3×0.3 inches or the like, and the determination feature is stored at a resolution lower than the predetermined value (e.g., 100 dpi) for a feature area having a large size of 2.0×2.0 inches or the like. Thus, by adjusting the resolution in accordance with the size of the feature area, even in the case where the area size of the feature area to be registered is large, it becomes possible to quickly complete scan processing including the erectness determination. Note that the resolution is adjusted in accordance with the size of the feature area in the present embodiment, but the adjustment of the resolution is not limited thereto, and the same resolution may be used for all feature areas irrespective of the size of the feature area.

In addition, the determination information storage unit 21 may store the size of the predetermined format image as the determination information. For example, when the erectness determination based on the determination information is performed in the case where a manuscript which is not related to a registered manuscript is scanned in erectness determination processing, processing time may be increased and an erroneous determination may occur. To cope with this, in the present embodiment, the size (width, height) of the predetermined format image (learning image) is stored as the determination information such that the erectness determination is not executed on an image of an unregistered manuscript or the like. With this, it becomes possible to determine that the erectness determination is not performed on the determination target image of which the size is not equal or close to the stored size of the predetermined format image.

The image reception unit 22 receives input of the learning image for learning (acquiring) information for determining the orientation of the image and the determination target image (the image on which the erectness determination is to be performed) serving as the determination target of the image orientation. The learning image and the determination target image are, e.g., images of documents such as a form and other captured images (camera images or the like). Note that the image reception unit 22 receives the input of these images from the image acquisition apparatus 9 in the present embodiment, but the image reception unit 22 is not limited thereto, and the image reception unit 22 may acquire (receive the input of) the image pre-stored in the storage device 14.

The specification reception unit 23 receives specification of the feature area in the learning image by the user. For example, a candidate for the feature area extracted by the candidate extraction unit 25 is selected by the user, and the specification reception unit 23 thereby receives the specification of the feature area. Note that, hereinafter, a method for selecting (specifying) a feature area from the candidates (feature proposal) extracted by the candidate extraction unit 25 by the user is referred to as "Auto".

In addition, bounds in the learning image are specified by a manual operation (a mouse operation or the like) by the user, and the specification reception unit 23 may thereby receive the specification of the feature area. Note that, hereinafter, a method in which bounds specification of the feature area is performed by the user is referred to as "Manual".

In addition, the candidate for the feature area extracted by the candidate extraction unit 25 in a proposed target area is selected by the user, and the specification reception unit 23 may thereby receive the specification of the feature area. Specifically, the specification reception unit 23 receives the bounds specification of the area (proposed target area) in the learning image from which the candidate for the feature area is to be extracted. Subsequently, when the candidate for the feature area is extracted in the proposed target area by the candidate extraction unit 25, the candidate is selected by the user and the specification reception unit 23 thereby receives the candidate for the feature area. Note that, hereinafter, a method in which the user selects (specifies) the feature area from the candidates extracted in the specified proposed target area is referred to as "Semi-auto".

The feature extraction unit 24 extracts the determination feature (a feature point, a feature amount, and image data) in the feature area specified in the learning image, and the position (an x coordinate, a y coordinate, or the like) of the feature area in the state in which the learning image is erect. In addition, the feature extraction unit 24 extracts a feature (a feature point, a feature amount, and image data) at a position corresponding to the position of the feature area stored in the determination information storage unit 21 in the determination target image (including a rotated state). Specifically, the feature extraction unit 24 extracts an area (an area used in the erectness determination (determination area)) at the position corresponding to (associated with) the position of the feature area from the determination target image, and then extracts the feature point(s) and the feature amount(s) and the like in the determination area. For example, the feature extraction unit 24 extracts the determination area having the same size as that of the feature area at the position corresponding to (associated with) the position of the feature area in the determination target image.

Note that known methods can be used in the extraction of the feature point and the feature amount, and the extraction thereof is performed by using a feature amount extraction method such as, e.g., scale-invariant feature transform (SIFT), speed-upped robust feature (SURF), or accelerated KAZE (A-KAZE). For example, the feature extraction unit 24 calculates, for each extracted feature point, the feature amount in a local area having the feature point at the center.

Note that the feature extraction unit 24 may extract the feature point(s) and the feature amount(s) and the like by using the extended area (e.g., the area of which the upper, lower, left, and right sides are extended by 0.5 inches) which is obtained by adding the peripheral area to the area corresponding to the registered feature area (the area having the same position and the same size as those of the feature area) as the determination area. With this, even in the case where a misalignment in a scanner apparatus or a correction error of scanned image processing has occurred in the determination target image, it is possible to extract the feature point(s) and the feature amount(s) at the position corresponding to the position of the feature area in the determination target image. In addition, the feature extraction unit 24 may adjust (set) the resolution of the determination area to the resolution of the feature area and then extract the feature point(s) and the feature amount(s) in the determination area.

The candidate extraction unit 25 extracts an area which images each having a predetermined format are highly likely to include in common from the learning image in the erect state, and uses the area as the candidate for the feature area. For example, the candidate extraction unit 25 extracts a plurality of rectangular text areas from the learning image having the predetermined format, calculates a score in which a position in the image, the area of the rectangle, and an aspect ratio are taken into consideration for each rectangular text area, and extracts the area having the highest score as the area (the candidate for the feature area) which the images each having the predetermined format are highly likely to include in common.

For example, it is highly likely that an area which is positioned in the upper portion of the image, has a large area, and has a low aspect ratio (can be assumed to have a character string having a large font size and a small number of characters) is an area which includes a cooperate name or a manuscript name or the like, and hence the calculated score is high. Thus, the candidate extraction unit 25 calculates the score by performing conversion processing in which the score of the area which is assumed to be highly likely to include the cooperate name or the manuscript name or the like is higher based on the position, area, and aspect ratio of the rectangular area. Subsequently, the candidate extraction unit 25 extracts the area having the highest calculated score as the candidate for the feature area. Note that the candidate extraction unit 25 may extract a plurality of candidates for the feature area by extracting a plurality of areas in descending order of the score (e.g., the top three areas). In addition, the candidate extraction unit 25 may extract, based on a plurality of the learning images having the same format, the candidate for the feature area having the format.

Further, an area in which gradation fluctuation is sharp (gradation fluctuation is not smooth), a large object in which pixels are coupled (an area in which black pixels are concentrated due to binarization or the like), or an area which is common to a plurality of the learning images having the same predetermined format may be extracted as the area which the predetermined format images are highly likely to include in common. For example, the large object in which pixels are coupled is assumed to be a corporate logo or the like.

The rotation unit 26 rotates the image in a range of not less than 0 degrees and less than 360 degrees. The rotation unit 26 rotates the determination target image by at least one angle of one or more angles such that the outer edge shape of the determination target image agrees with the outer edge shape of the predetermined format image in its erect state. For example, in the case where the outer edge shape of the determination target image agrees with the outer edge shape of the predetermined format image in the erect state at angles of 0 degrees, 90 degrees, 180 degrees, and 270 degrees (in the case of a square and the like), the rotation unit 26 rotates the determination target image by at least one of these angles. In addition, in the case where the predetermined format image is a rectangular image (a rectangle or the like) having a long side and a short side, the rotation unit 26 rotates the determination target image by at least one of two angles (e.g., 0 degrees and 180 degrees, or 90 degrees and 270 degrees) which allow the relationship between the long side or the short side and a longitudinal side or a transverse side to agree with that of the predetermined format image in the erect state. In addition, the rotation unit 26 rotates the learning image in an erectness direction in response to a rotation instruction in the erectness direction by the user.

The erectness determination unit 27 determines whether the feature corresponding to the determination feature in the predetermined format image is present at the position (determination area) corresponding to the position of the feature area in the predetermined format image in the determination target image. Subsequently, the erectness determination unit 27 determines whether the determination target image is erect by determining the orientation of the determination target image (a rotation angle with respect to the predetermined format image) based on the determination result of the determination target image at each rotation angle. Hereinafter, processing performed by the erectness determination unit 27 will be specifically described. Hereinafter, the predetermined format image registered in the determination information storage unit 21 is referred to as a registered image.

The erectness determination unit 27 determines whether the feature point is present in the determination area in the determination target image for the determination target image at each rotation angle (e.g., 0 degrees, 90 degrees, 180 degrees, and 270 degrees). Subsequently, in the case where the feature point is extracted in the determination area, the erectness determination unit 27 performs matching processing (feature point (feature amount) matching) between the registered image and the determination target image based on the feature point and the feature amount. As the matching processing between the two images, it is possible to use known methods, and the matching processing is performed by using a method such as, e.g., brute-force or fast library for approximate nearest neighbors (FLANN). Note that, in the present embodiment, the matching processing is not performed in the case where the feature point is not extracted in the determination area, but the matching processing is not limited thereto, and the matching processing may be executed in the case where the feature point is not extracted similarly to the case where the feature point is extracted. However, in this case, the feature point is not detected, and hence the number of matching feature points is determined to be zero.

The erectness determination unit 27 calculates, e.g., a distance on feature point space between the feature amount of the feature point in the registered image (feature area) and the feature amount of the feature point in the determination target image (determination area), and determines points having the calculated distance which is shortest or is less than a threshold value to be matching feature points (feature points corresponding to each other). For example, in the case where the feature amount is a SIFT feature amount, a distance between two points on 128-dimensional space is calculated. The erectness determination unit 27 calculates the number of matching feature points between the two images (between the feature area and the determination area) by this feature point matching.

In addition, the erectness determination unit 27 determines the degree of similarity of the feature amount between two points by comparing the feature amount of the feature point in the registered image (feature area) with the feature amount of the feature point in the determination target image (determination area). For example, the erectness determination unit 27 calculates the degree of similarity of the feature amount between two points by performing conversion processing in which the degree of similarity increases as the distance of the feature amount decreases based on the distance of the feature amount between matching feature points. Note that, as the distance between the feature amounts, a distance such as, e.g., Euclidian distance or Hamming distance is used. The erectness determination unit 27 calculates the degree of similarity of the feature amount (the degree of similarity of the feature amount between the two images) between the feature area (registered image) and the determination area (determination target image) by using the degree of similarity of the feature amount which is calculated for each of the matching feature points. For example, a representative value such as an average, a median, or a mode, or a total value of the degree of similarity of the feature amount calculated for each of the matching feature points may be calculated as the degree of similarity of the feature amount between the two images.

The erectness determination unit 27 determines whether the determination target image is erect according to the result of the matching processing (the number of matching feature points and the degree of similarity of the feature amount). For example, the erectness determination unit 27 performs the erectness determination by comparing the number of matching feature points and the degree of similarity of the feature amount with predetermined threshold values. Specifically, the number of matching feature points and the degree of similarity of the feature amount are compared with the predetermined threshold values for the determination target image at each rotation angle, and the rotation angle of the determination target image in the case where both of them exceed the threshold values is determined to be the orientation of the determination target image.

For example, when the matching processing between the determination target image having a rotation angle of 0 degrees and the registered image is performed, in the case where the number of matching feature points and the degree of similarity of the feature amount exceed the predetermined threshold values, it is determined that the orientation of the determination target image is erect (a difference in angle between the determination target image and the registered image is 0 degrees). In addition, for example, when the matching processing between the determination target image which is rotated counterclockwise by 90 degrees and the registered image is performed, in the case where the number of matching feature points and the degree of similarity of the feature amount exceed the predetermined threshold values, it is determined that the orientation of the determination target image (before rotation) is not erect (the orientation rotated clockwise by 90 degrees with respect to the orientation of the registered image). Note that the erectness determination unit 27 may set a plurality of the predetermined threshold values.

In addition, the erectness determination unit 27 may perform the erectness determination by determining a value indicative of the certainty of erectness of the determination target image at each rotation angle according to the number of matching feature points and the degree of similarity of the feature amount. In this case, the erectness determination unit 27 determines the orientation of the determination target image and performs the erectness determination by comparing the values indicative of the certainty of the erectness at the individual rotation angles. In the present embodiment, the number of votes corresponding to the number of matching feature points is used as the value indicative of the certainty of the erectness, but the value is not limited thereto as long as the value indicates the certainty of the erectness, and the number of votes corresponding to the degree of similarity of the feature amount or a score (points) based on the number of matching feature points and/or the degree of similarity of the feature amount, or the like, may also be used.

For example, the erectness determination unit 27 determines whether the determination target image is erect by comparing the numbers of votes at the individual rotation angles and determining the rotation angle having the highest number of votes as the angle of the determination target image with respect to the registered image.

Figure 5:
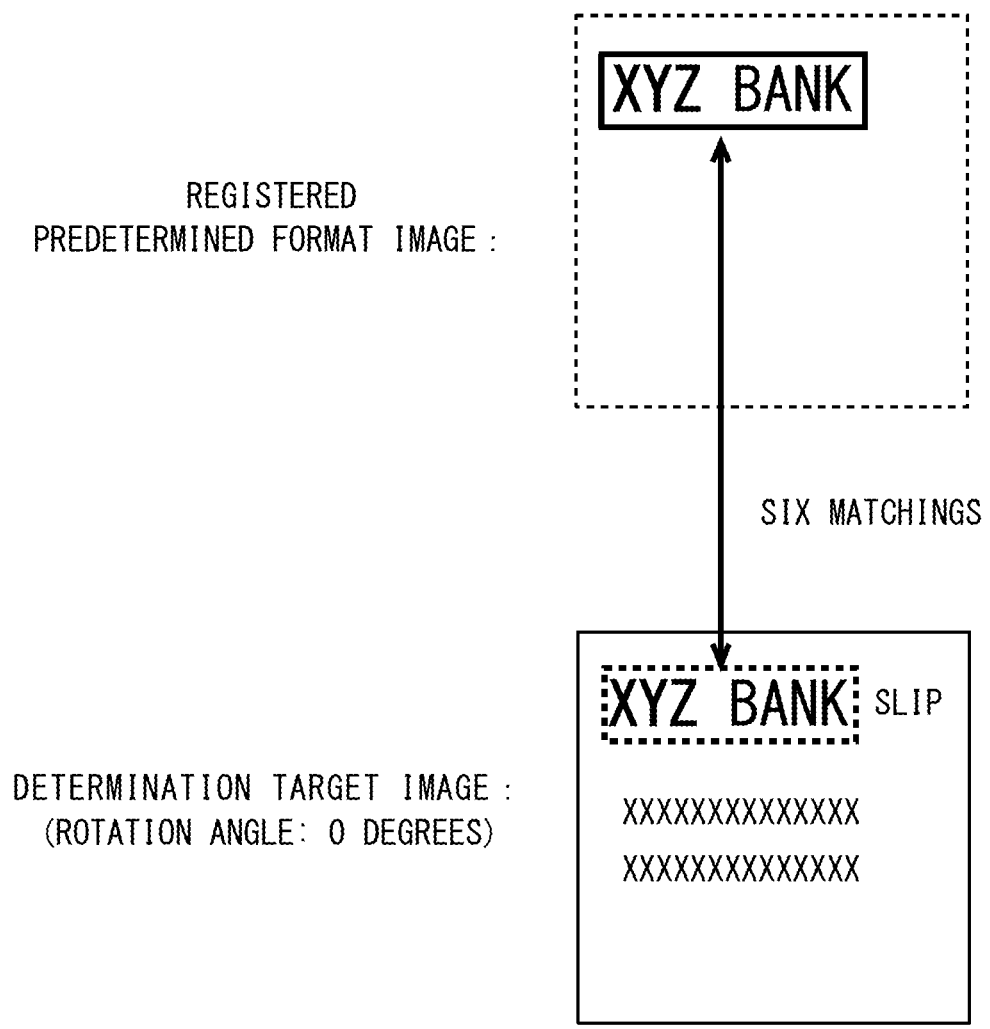
FIG. 5 is a diagram showing an example of erectness determination processing (with matching processing) of a determination target image (rotation angle: 0 degrees) according to the embodiment.

FIG. 5 is a diagram showing an example of erectness determination processing (with matching processing) of the determination target image (rotation angle: 0 degrees) according to the present embodiment. As shown in FIG. 5, in the case of the determination target image having a rotation angle of 0 degrees, as the result of the matching processing between the determination area (determination target image) and the feature area (registered image), it is determined that six feature points match. In the example in FIG. 5, the determination target image is erect, and hence it is determined that six feature points match, i.e., a plurality of feature points match, between the determination area and the registered feature area. In this case, the erectness determination unit 27 determines the number of votes at the rotation angle of 0 degrees to be "6" which is the number of matching feature points.

Figure 6:
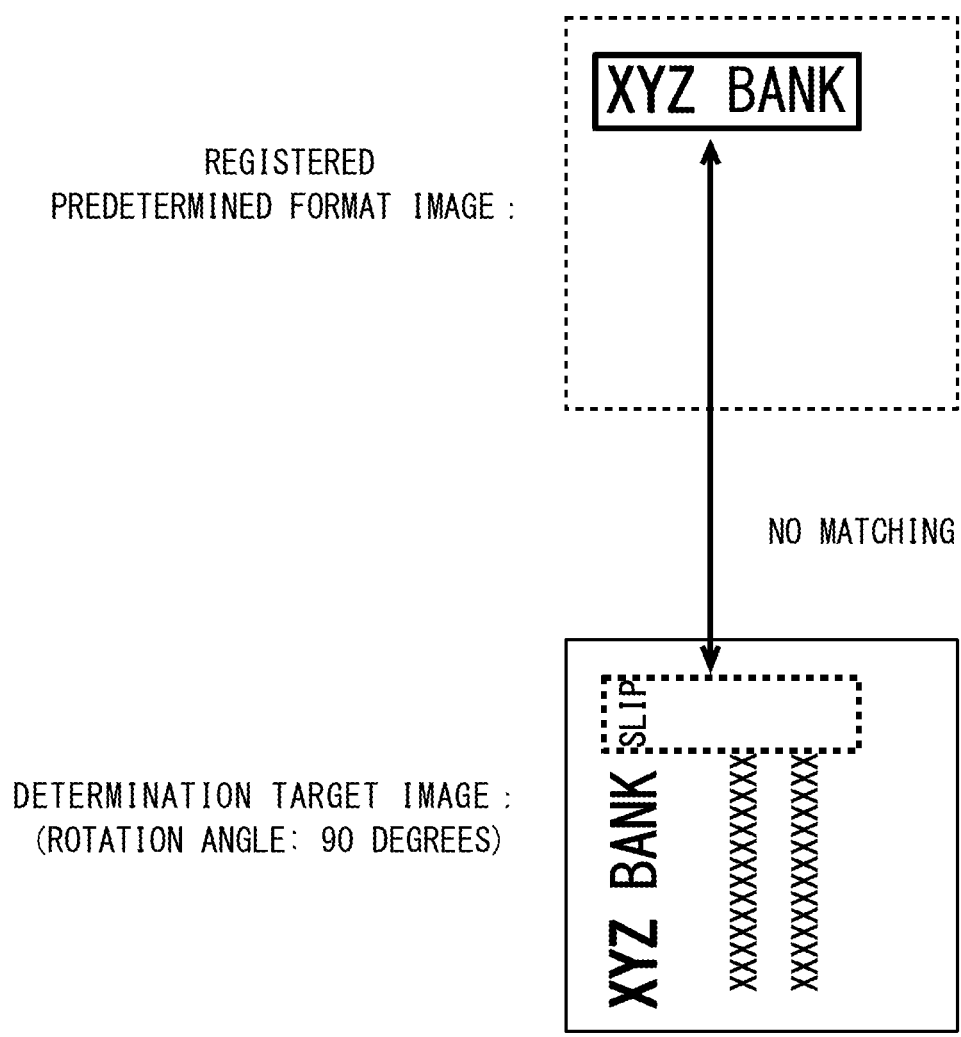
FIG. 6 is a diagram showing an example of the erectness determination processing (with matching processing) of the determination target image (rotation angle: 90 degrees) according to the embodiment.

FIG. 6 is a diagram showing an example of the erectness determination processing (with matching processing) of the determination target image (rotation angle: 90 degrees) according to the present embodiment. As shown in FIG. 6, in the case where the determination target image is rotated counterclockwise by 90 degrees, as the result of the matching processing between the determination area (determination target image) and the feature area (registered image), it is determined that no feature points match. In this case, the erectness determination unit 27 determines the number of votes at the rotation angle of 90 degrees to be "0".

Figure 7:
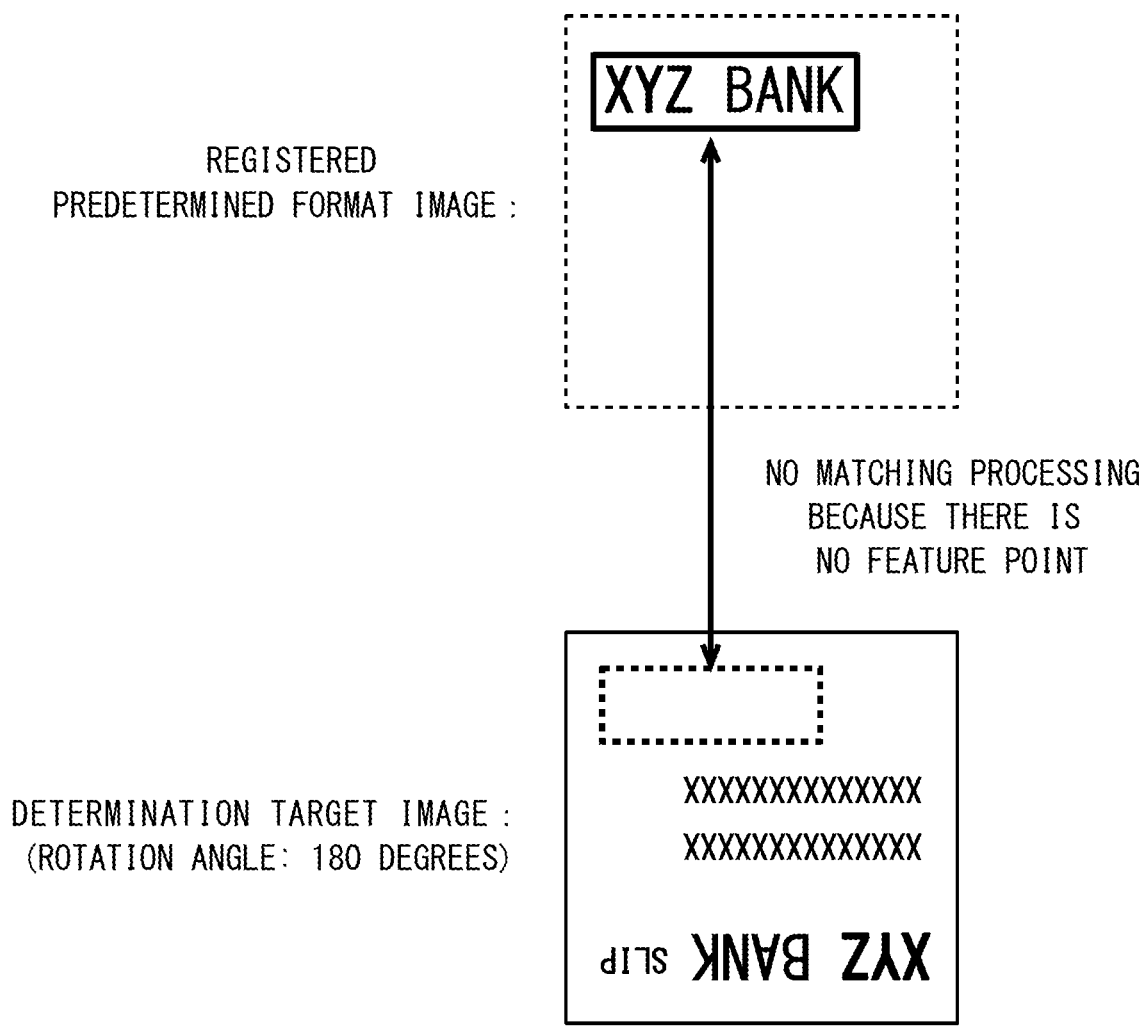
FIG. 7 is a diagram showing an example of the erectness determination processing (without matching processing) of the determination target image (rotation angle: 180 degrees) according to the embodiment.

FIG. 7 is a diagram showing an example of the erectness determination processing (without matching processing) of the determination target image (rotation angle: 180 degrees) according to the present embodiment. As shown in FIG. 7, in the case where the determination target image is rotated by 180 degrees, an image is not formed in the determination area of the determination target image, and the feature point is not detected from the determination area. For example, in the case where the determination area is included in a white area or the like, there are cases where the feature point is not detected. In such cases, in the present embodiment, the matching processing is not performed for the rotation angle of 180 degrees, and the rotation angle of 180 degrees is excluded from the target for comparison of the number of votes (the number of votes is not determined).

Figure 8:
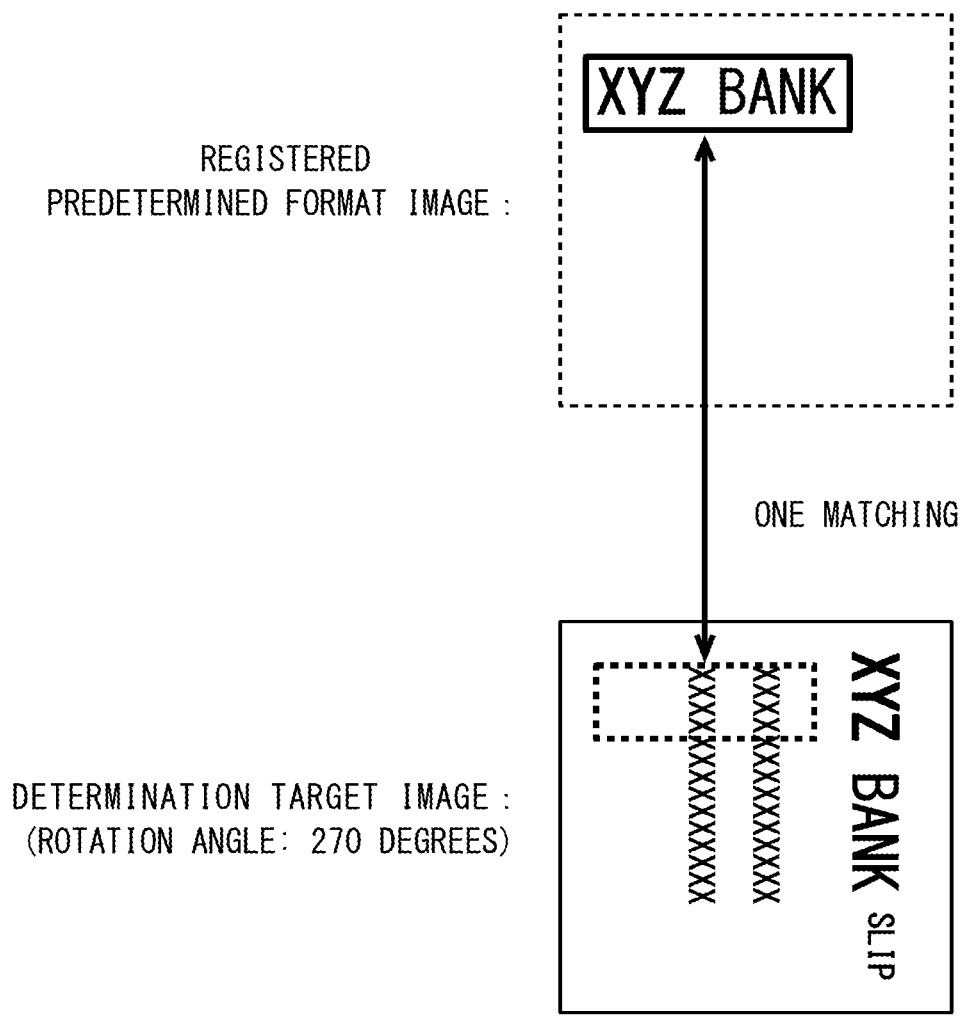
FIG. 8 is a diagram showing an example of the erectness determination processing (with matching processing) of the determination target image (rotation angle: 270 degrees) according to the embodiment.

FIG. 8 is a diagram showing an example of the erectness determination processing (with matching processing) of the determination target image (rotation angle: 270 degrees) according to the present embodiment. As shown in FIG. 8, in the case where the determination target image is rotated counterclockwise by 270 degrees, as the result of the matching processing between the determination area (determination target image) and the feature area (registered image), it is determined that one feature point matches. In this case, the erectness determination unit 27 determines the number of votes at the rotation angle of 270 degrees to be "1" which is the number of matching feature points.

The erectness determination unit 27 compares the numbers of votes shown in FIGS. 5, 6, and 8, and determines (uses) the rotation angle of 0 degrees having the highest number of votes to be the rotation angle of the determination target image with respect to the registered image. With this, it becomes possible for the erectness determination unit 27 to determine that the determination target image is erect.

Note that the number of matching feature points and the degree of similarity of the feature amount are compared with the threshold values in the present embodiment, but the comparison is not limited thereto, and the erectness determination may also be performed by comparing only one of the number of matching feature points and the degree of similarity of the feature amount with the predetermined threshold value. In addition, the number of votes may be corrected by using the result of the erectness determination using another method.

In addition, the erectness determination unit 27 may determine whether the feature corresponding to the determination feature is present according to the resolution adjusted in accordance with the size of the feature area. Specifically, the erectness determination unit 27 may determine whether the feature corresponding to the determination feature which is stored at the adjusted resolution is present in the determination area of which the resolution is adjusted to the resolution which is adjusted in accordance with the size of the feature area in the registered image. With this, as described above, even in the case where the area size of the feature area to be registered is large, it becomes possible to quickly complete the scan processing.

Further, the erectness determination unit 27 may perform the determination on, among input determination target images, a determination target image of which the size is equal or close to the size of the predetermined format image stored in the determination information storage unit 21. With this, as described above, it becomes possible to quickly complete the scan processing without performing the erectness determination on an image of which the determination information is not registered.

In addition, the erectness determination unit 27 may detect an erroneous determination. Feature point matching by the erectness determination unit 27 is performed on a per point basis, and hence there is a possibility that points which are not related to the same determination feature match each other. Accordingly, there are cases where it is erroneously determined that the determination target image having a format different from that of the registered image has the feature corresponding to the determination feature in the registered image, and it is erroneously determined that the determination target image having the same format as that of the registered image does not have the feature corresponding to the determination feature in the registered image.

Figure 9:
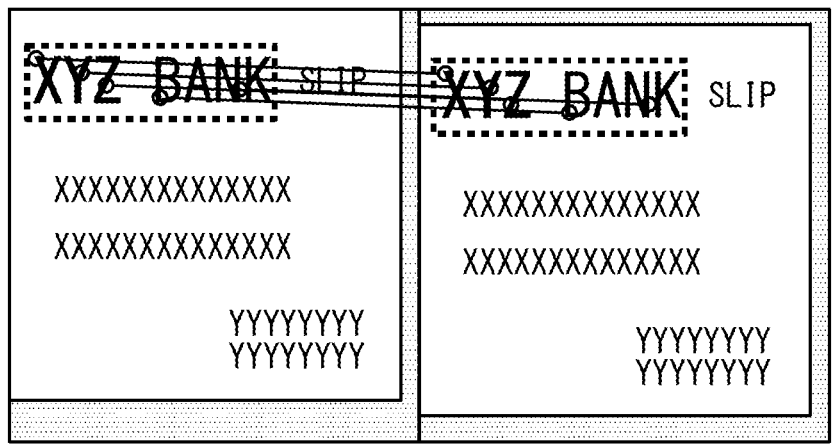
FIG. 9 is a diagram showing an example of relative positions between matching points in a correct determination according to the embodiment.

FIG. 9 is a diagram showing an example of relative positions between matching points in a correct determination according to the present embodiment. As shown in FIG. 9, the determination target image is erect, and hence it is determined that the registered image and the determination target image match each other at many feature points as the result of the matching processing. Thus, in the case where the matching processing is performed correctly (in the case where the determination is not the erroneous determination), it can be seen that, the relative positions, each of which is a relative position between matching feature points (the position of the feature point in the determination target image with respect to the feature point in the registered image), regarding all feature points, are almost the same each other.

Figure 10:
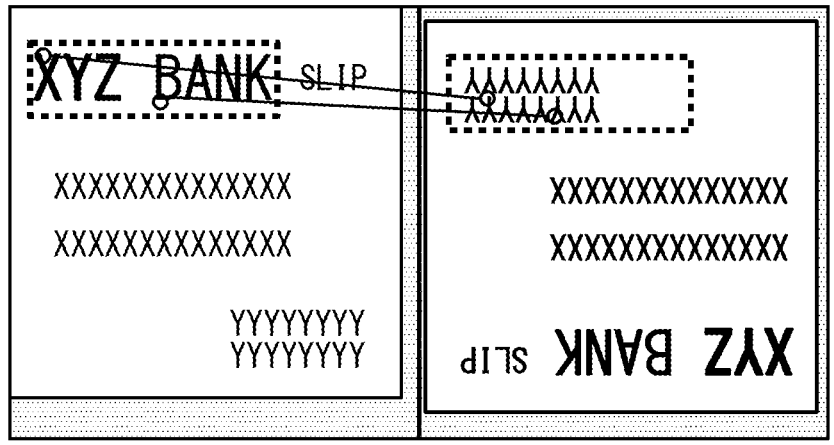
FIG. 10 is a diagram showing an example of relative positions between matching points in an erroneous determination according to the embodiment.

FIG. 10 is a diagram showing an example of the relative positions between matching points in the erroneous determination according to the present embodiment. As shown in FIG. 10, irrespective of the fact that the determination target image is not erect, there are cases where the feature points match those in the registered image due to the erroneous determination. However, in the case of the erroneous determination, as shown in FIG. 10, it can be seen that the relative positions, each of which is a relative position between matching feature points, regarding all feature points, are not the same.

Consequently, the erectness determination unit 27 detects the erroneous determination based on the relative positions, each of which is a relative position between the points (the feature point in the registered image and the feature point in the determination target image) which match each other as the result of the matching processing (feature point matching). For example, the erectness determination unit 27 removes outlier points (noise) in advance from matching feature points, and calculates a distance (difference) between matching points and a gradient of a line with which matching points are connected for each feature point. Subsequently, the erectness determination unit 27 calculates variance values of the distance and the gradient based on the distance and the gradient for each feature point and determines confidence of the determination from the variance values, and the erectness determination unit 27 determines that the determination is the erroneous determination when the confidence is not more than a threshold value.

For example, the erectness determination unit 27 removes, as the outlier point (noise), a feature point having the number of adjacent feature points which is less than a predetermined number or a feature point having the distance between matching points which exceeds a predetermined value. In addition, as the determination is not erroneous, the relative positions for the feature points become the same each other, and the variance value of each of the distance and the gradient approaches 0, and hence the erectness determination unit 27, e.g., calculates the confidence by performing conversion processing in which the confidence increases as the variance value of each of the distance and the gradient approaches 0. The confidence is calculated by performing, e.g., a method in which the complement of a normalized variance value is determined, or a method in which a rank is associated with each range of the variance value. Note that it may also be determined whether the determination is the erroneous determination by comparing at least one of the variance values of the distance and the gradient with a threshold value instead of using the confidence.

In addition, the erectness determination unit 27 may dynamically change the order of the feature area (registered image) used in the erectness determination. In the case where the determination information storage unit 21 stores the determination features in a plurality of the predetermined format images (feature areas), the erectness determination processing is performed by using the individual feature areas sequentially, and hence there are cases where the scan processing including the erectness determination is not completed quickly. Therefore, by dynamically changing the order of the feature area (registered image) used in the erectness determination, it becomes possible to quickly complete the scan processing including the erectness determination. Specifically, the erectness determination unit 27 determines the order of the predetermined format images used when the erectness determination of the determination target image is performed, based on the erectness determination result of the preceding determination target image on which the erectness determination has been performed before the determination target image.

For example, at a worksite where scanning is performed, a large number of documents having the same format (e.g., the same forms) are often scanned and, in this case, by performing the erectness determination processing which uses the registered image (feature area) of the document first, the erectness determination processing which uses the other registered images (feature areas) becomes unnecessary. Therefore, in the case where the registered image (feature area) which matches the determination target image (determined to be the image having the same format) is present, the erectness determination unit 27 performs the erectness determination processing which uses the registered image having matched the determination target image first on the next determination target image.

FIG. 11 is a diagram showing an example in which the order of the feature area used for the erectness determination processing is changed according to the present embodiment. As shown in FIG. 11, while the erectness determination unit 27 performs the erectness determination processing on the determination target images by using the feature areas (registered images) in the order of A, B, C, and D, when the second determination target image matches the feature area C, the feature area used when the erectness determination processing is performed on the third determination target image first is determined to be the feature area C. Similarly, when the third determination target image matches the feature area B, the feature area used when the erectness determination processing is performed on the fourth determination target image first is determined to be the feature area B. Similarly, also in the fifth and sixth determination target images, when each of the fourth and the fifth determination target images matches the feature area B, the feature area used when the erectness determination processing is performed on each of the fifth and the sixth determination target images first is determined to be the feature area B.

In the example in FIG. 11, the third to sixth determination target images are images having the same format (e.g., images of the same form) and, by dynamically changing the order of the feature area, it is possible to determine whether the fourth to sixth determination target images are erect by performing the erectness determination processing using only the feature area B, and hence it becomes possible to quickly complete the scan processing.

The orientation correction unit 28 corrects the orientation of the determination target image based on the determination result by the erectness determination unit 27. For example, when it is determined that the determination target image is an image which is rotated clockwise by R degrees (e.g., 90 degrees) with respect to the registered image, the orientation correction unit 28 corrects the orientation by rotating the determination target image by R degrees (e.g., 90 degrees) in a direction (counterclockwise) opposite to the rotation direction of the determination target image with respect to the registered image such that the determination target image is erect.

The display unit 29 executes various display processing via the output device 17 in the information processing apparatus 1. For example, the display unit 29 generates a registration screen or the like in which the user registers the determination information of the predetermined format image (learning image), and displays (outputs) the generated screen via the output device 17 such as a display.

Processing Flow

Next, a description will be given of the flow of processing executed by the information processing apparatus according to the present embodiment by using a flowchart. Note that the specific content and processing order of the processing shown in the flowchart described below are examples for implementing the present disclosure. The specific processing content and processing order may be appropriately selected according to the mode of implementation of the present disclosure.

Figure 12:
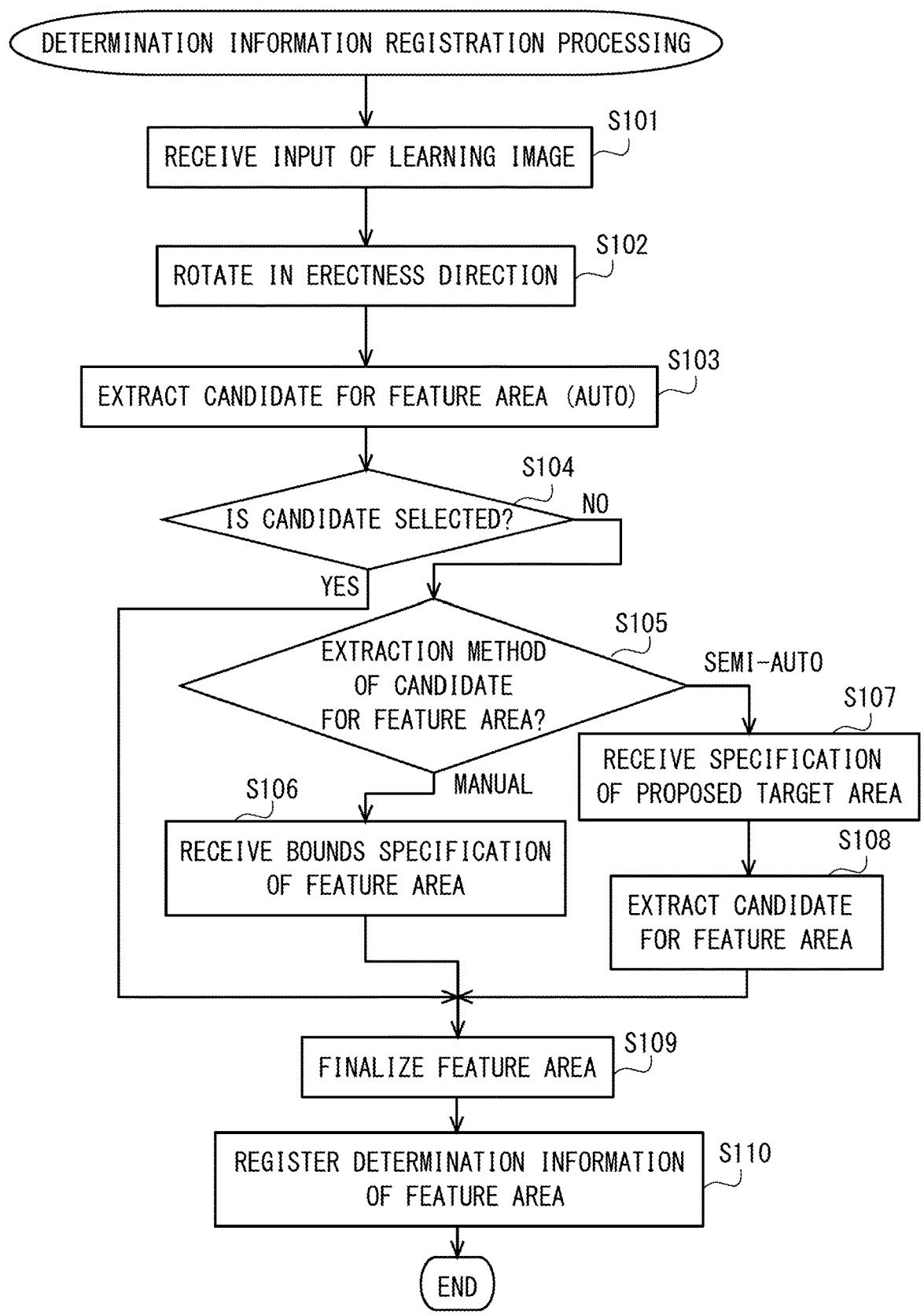
FIG. 12 is a flowchart showing the outline of the flow of determination information registration processing according to the embodiment.

FIG. 12 is a flowchart showing the outline of the flow of determination information registration processing according to the present embodiment. The determination information registration processing according to the present embodiment is executed at a timing when, in the information processing apparatus 1, a new registration button or the like is pressed on the registration screen by the user and an instruction to scan a form of which the determination information is to be newly registered is performed, or the like. Note that, in the present embodiment, the image of the form is acquired by scanning the form, but the image is not limited to the form as long as the image is a captured image, and images or photographs of other documents may be used.

In Step S101, input of the predetermined format image (learning image) is received. When the scan processing of the form of which the determination information is to be registered is performed in the image acquisition apparatus 9, the image reception unit 22 acquires the image (learning image) of the scanned form from the image acquisition apparatus 9. Note that the image reception unit 22 may acquire a pre-stored learning image from the storage device 14 in response to an instruction to acquire the learning image from the user. Thereafter, the processing proceeds to Step S102.

In Step S102, with an instruction of the user, the learning image is rotated in the erectness direction. When an instruction to rotate the learning image in the erectness direction is received from the user, the rotation unit 26 rotates the learning image of which the input is received in Step S101 in the erectness direction.

Figure 13:
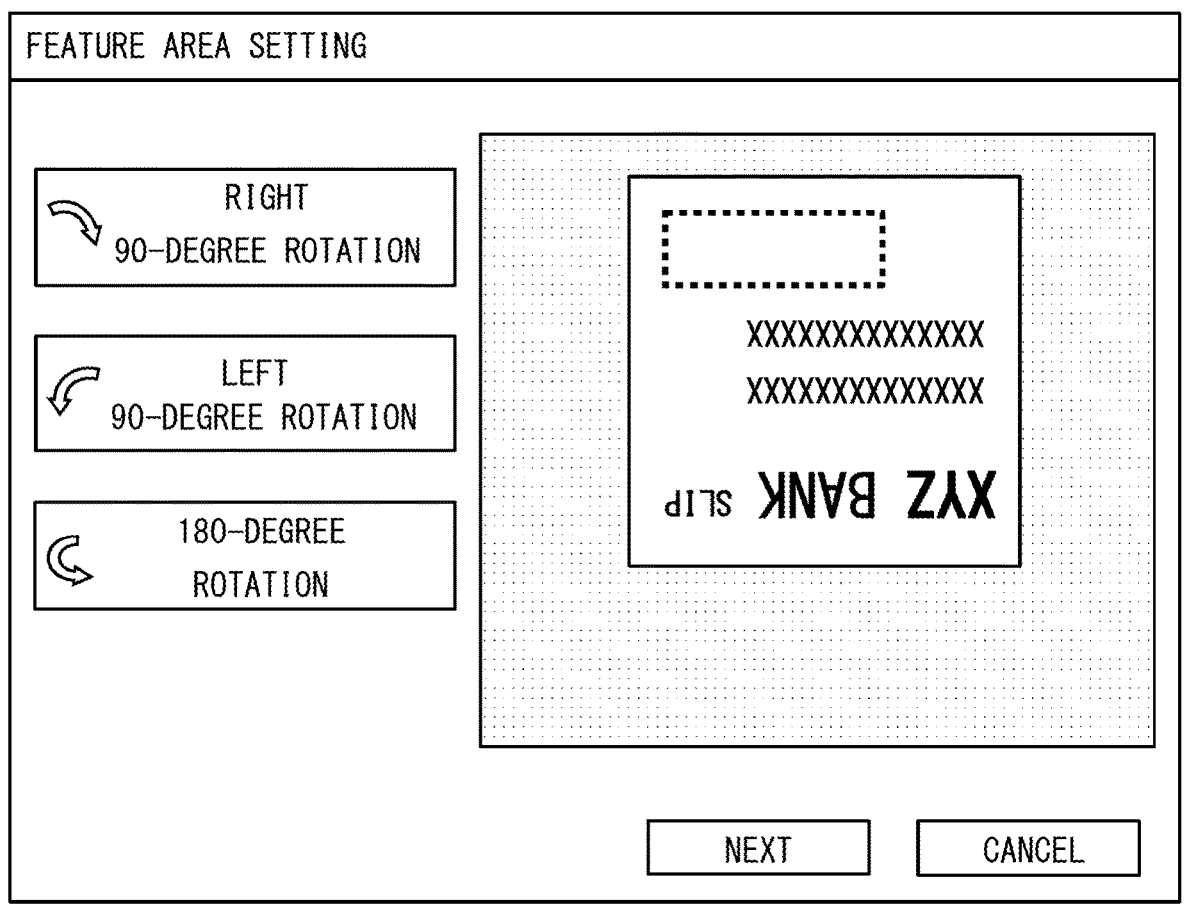
FIG. 13 is a schematic diagram showing an example of a registration screen for rotating a learning image according to the embodiment.

FIG. 13 is a schematic diagram showing an example of the registration screen for rotating the learning image according to the present embodiment. As shown in FIG. 13, for example, when the user visually determines that the acquired learning image becomes erect by being rotated by 180 degrees and presses a "180-degree rotation" button, the rotation unit 26 rotates the learning image by 180 degrees. Similarly, when the user presses a "left 90-degree rotation" button or a "right 90-degree rotation" button, the rotation unit 26 rotates the learning image by 90 degrees counterclockwise (leftward) or 90 degrees clockwise (rightward). Thereafter, the processing proceeds to Step S103.

In Step S103, the candidate for the feature area is extracted. The candidate extraction unit 25 extracts, from the learning image in the erect state, the area which images each having the predetermined format are highly likely to include in common as the candidate for the feature area (Auto processing). Note that the candidate extraction unit 25 extracts one or a plurality of candidates for the feature area. Thereafter, the processing proceeds to Step S104.

In Step S104, it is determined whether the extracted candidate for the feature area is selected by the user. The specification reception unit 23 determines whether the candidate for the feature area extracted in Step S103 is selected by the user on the registration screen or the like.

Figure 14:
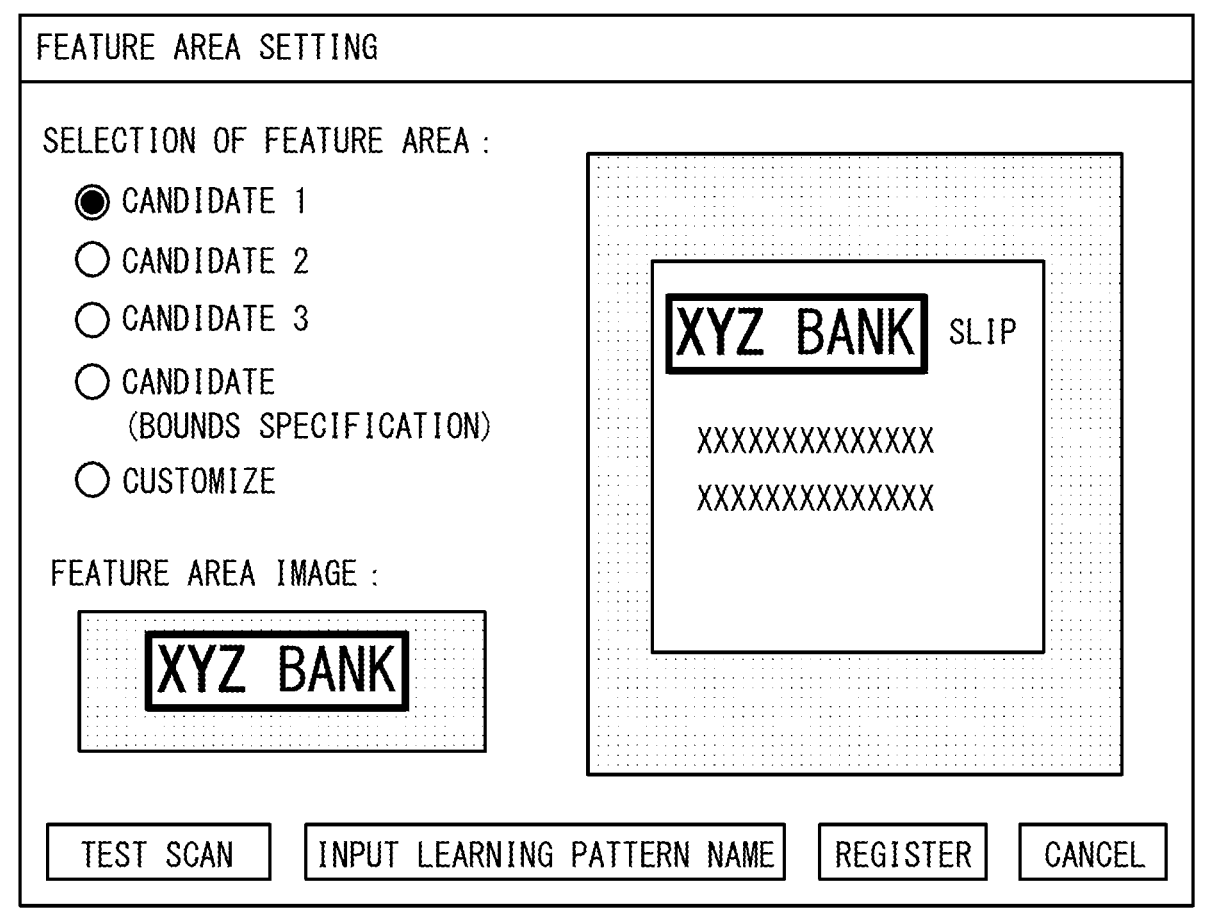

FIG. 14 is a schematic diagram showing an example of the registration screen for determining the feature area according to the present embodiment. As shown in FIG. 14, for example, one of buttons of "candidate 1" to "candidate 3" is pressed by the user, and the specification reception unit 23 thereby determines that the candidate for the feature area extracted in Step S103 is selected. In the case where the candidate for the feature area is selected, the processing proceeds to Step S109. On the other hand, in the case where the candidate for the feature area is not selected, the processing proceeds to Step S105. Note that, in the case where the candidate for the feature area is selected by the user, for example, as shown in FIG. 14, the candidate for the feature area may be displayed in "feature area image" on the registration screen by the display unit 29.

In Step S105, as the extraction method of the candidate for the feature area, specification of Manual or Semi-auto is received. For example, as shown in FIG. 14, a "customize" button is pressed by the user, and the specification reception unit 23 thereby receives the specification for setting the candidate extraction method to Manual. In this case, the processing proceeds to Step S106. In addition, a "candidate (bounds specification)" button is pressed by the user, and the specification reception unit 23 thereby receives the specification for setting the candidate extraction method to Semi-auto. In this case, the processing proceeds to Step S107.

In Step S106, the bounds specification of the feature area by the user is received. For example, the specification reception unit 23 receives the bounds specification of the feature area in response to a manual operation by the user such as a mouse drag operation. Similarly to Step S104, the specified bounds (area) may be displayed in "feature area image" on the registration screen shown in FIG. 14. Thereafter, the processing proceeds to Step S109.

In Step S107, the specification of the proposed target area by the user is received. For example, the specification reception unit 23 receives the bounds specification of the proposed target area (the area in which the candidate for the feature area is to be extracted) in response to the manual operation by the user such as the mouse drag operation. Thereafter, the processing proceeds to Step S108.

In Step S108, the candidate for the feature area is extracted in the proposed target area. In the proposed target area specified in Step S107, the candidate extraction unit 25 extracts the area which the images each having the predetermined format are highly likely to include in common as the candidate for the feature area, similarly to Step S103. Note that, with regard to the candidate for the feature area in the proposed target area, similarly to the case of the Auto processing, a plurality of the candidates may be extracted or only one candidate may be extracted. In addition, similarly to Step S104, as shown in, e.g., FIG. 14, the extracted candidate for the feature area is displayed in "feature area image" on the registration screen. Thereafter, the processing proceeds to Step S109.

In Step S109, from the area extracted by one of Auto, Manual, and Semi-auto, the feature area used in orientation correction is finalized. For example, one of "candidate 1" to "candidate 3", "candidate (bounds specification)", and "customize" on the registration screen shown in FIG. 14 is selected and a "registration" button is then pressed, and the specification reception unit 23 thereby receives input of finalization of the feature area. Note that, before the finalization of the feature area, by pressing a "test scan" button or the like by the user, it may be determined whether another manuscript having the same format is rotated (corrected) correctly in the erectness direction by using the selected candidate for the feature area ("candidate 1" to "candidate 3", "candidate (bounds specification)", and "customize"). Thereafter, the processing proceeds to Step S110.

In Step S110, the determination information of the finalized feature area is registered (stored). The feature extraction unit 24 extracts the determination feature (the feature point and the feature amount and the like) in the feature area finalized in Step S109 and the position of the feature area in the state in which the learning image is erect. For example, the feature extraction unit 24 extracts (calculates) the feature point and the feature amount in the feature area by a method such as SIFT, SURF, or A-KAZE. Subsequently, the determination information storage unit 21 associates the determination feature including the feature point, the feature amount, and the image data and the like in the feature area with the position of the feature area in the state in which the learning image is erect, and stores them.

Note that, at this point, the determination information storage unit 21 may store the determination feature at the resolution adjusted in accordance with the size of the feature area. In addition, the determination information storage unit 21 may use the area (extended area) obtained by adding the surrounding area to the area finalized (specified) by the user in Step S109 as the feature area, and store the determination feature. Further, the determination information storage unit 21 may associate the size of the learning image with the determination feature and the position of the feature area and store them. Thereafter, the processing shown in the present flowchart is ended.

Note that the candidate for the feature area is extracted (selected) by branch processing shown in Steps S103 to S108 described above, but the extraction of the candidate therefor is not limited thereto and, as long as the candidates for the feature area are extracted by, among Auto, Manual, and Semi-auto, one or a plurality of methods and the feature area is selected from among the candidates for the feature area, any branch processing can be executed.

Figure 15:
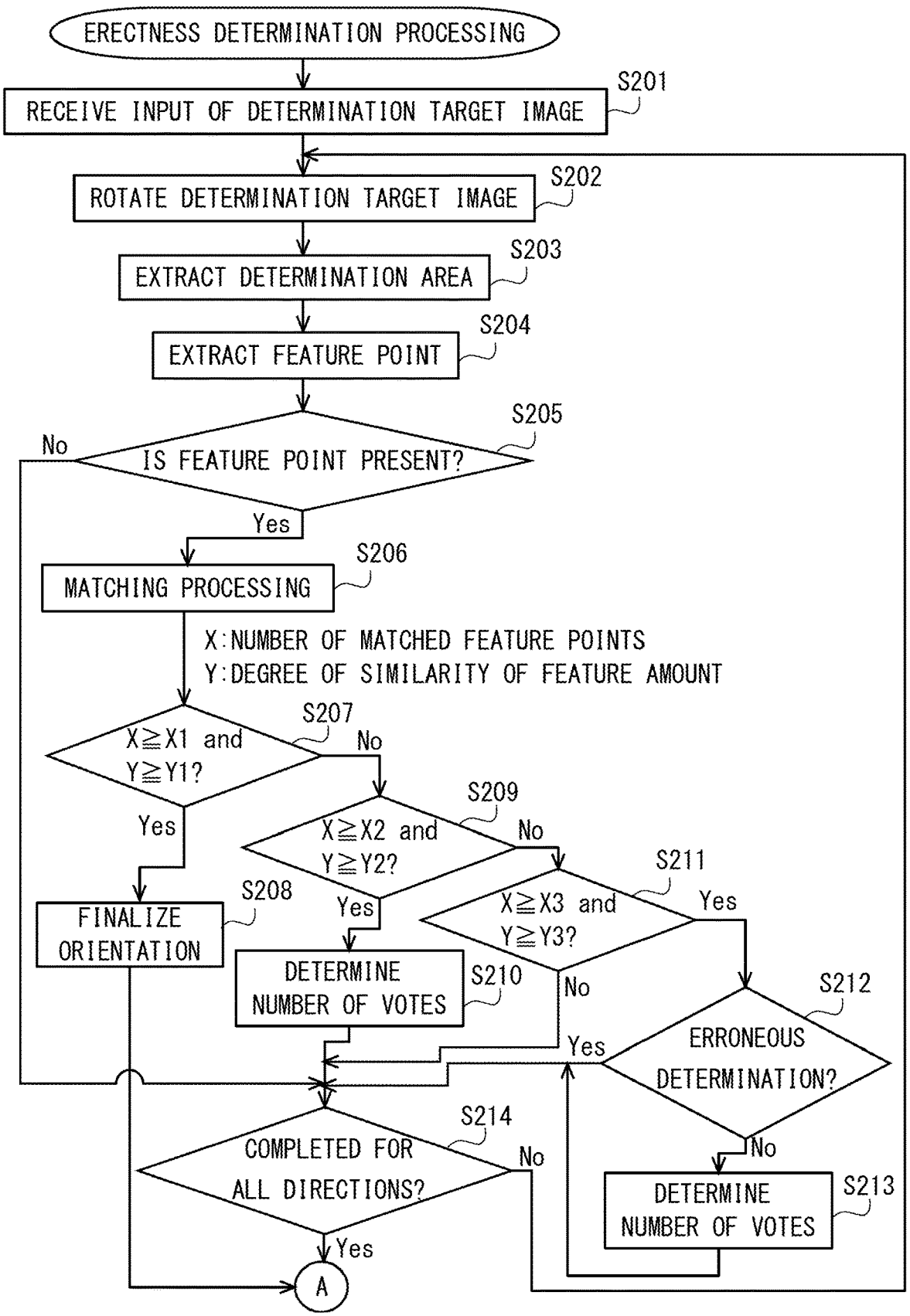
FIG. 15 is a flowchart (1) showing the outline of the flow of the erectness determination processing according to the embodiment.
Figure 16:
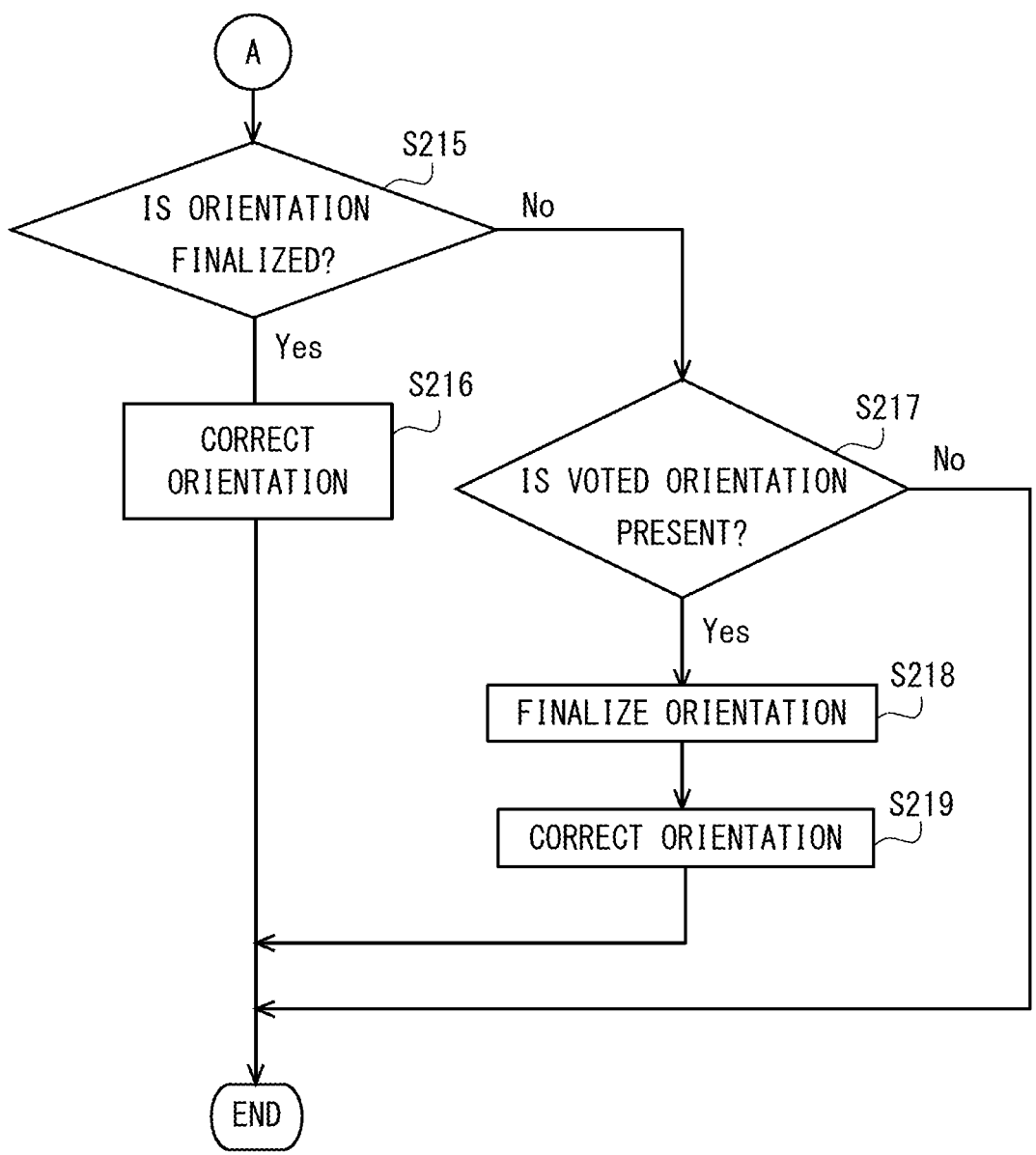
FIG. 16 is a flowchart (2) showing the outline of the flow of the erectness determination processing according to the embodiment.

Each of FIG. 15 and FIG. 16 is a flowchart showing the outline of the flow of the erectness determination processing according to the present embodiment. The erectness determination processing according to the present embodiment is executed at a timing when an instruction to scan the form on which the erectness determination is to be performed is performed by the user in the information processing apparatus 1. Note that the image of the form is acquired by scanning the form in the present embodiment, but the image is not limited thereto as long as the image is a captured image, and images and photographs of other documents may be used.

In Step S201, input of the determination target image is received. When the scan processing of the form serving as the target of the erectness determination is performed in the image acquisition apparatus 9, the image reception unit 22 acquires the image (determination target image) of the scanned form from the image acquisition apparatus 9. Note that the image reception unit 22 may receive a pre-stored determination target image from the storage device 14 in response to an instruction to acquire the determination target image from the user. Thereafter, the processing proceeds to Step S202. Note that, in the case where the size of the acquired determination target image is not equal or close to the size of the predetermined format image stored in the determination information storage unit 21 in Step S201, the execution of subsequent processing (Steps S202 to S219) by the erectness determination unit 27 may be canceled.

In Step S202, the determination target image is rotated. The rotation unit 26 rotates the determination target image by any one of angles such that the outer edge shape of the determination target image agrees with the outer edge shape of the predetermined format image in the erect state. Every time the determination target image is rotated by any one of the angles in Step S202, processing from Step S203 to Step S213 (iterative processing) is executed, and the iterative processing is executed until it is determined that the determination target image has been rotated by all of the angles such that the outer edge shapes agrees with each other in Step S214. For example, as shown in FIGS. 5 to 8, in the case where the registered image and the determination target image are square, and the outer edge shapes thereof agree with each other, every time the determination target image is rotated by any one of the angles (0 degrees, 90 degrees, 180 degrees, 270 degrees) which allow the outer edge shapes to agree with each other in Step S202, the extraction of the determination area and the matching processing are executed in Steps S203 to S213. Thereafter, the processing proceeds to Step S203. Note that, in the present embodiment, in the case where the orientation of the determination target image is finalized in Step S208, the iterative processing is suspended.

In Step S203, the area used in the erectness determination is extracted. The feature extraction unit 24 extracts the area (determination area) corresponding to the feature area at the position corresponding to the position of the feature area in the determination target image for the determination target image at each rotation angle. For example, as shown in FIG. 5, in the determination target image, at the position corresponding to (associated with) the position of the feature area, the determination area (a frame in a dotted line) having the same size as that of the feature area is extracted.

Note that, in Step S203, the feature extraction unit 24 may adjust (set) the resolution of the image of the extracted determination area to the resolution adjusted in accordance with the size of the feature area in the registered image. For example, in the case where the size of the feature area is large and the determination feature is stored at a resolution (100 dpi or the like) less than a predetermined value (300 dpi or the like), the resolution of the image of the extracted determination area is also changed to 100 dpi. In addition, the feature extraction unit 24 may use the extended area (e.g., the area of which the upper, lower, left, and right sides are extended by 0.5 inches) obtained by adding the peripheral area to the area corresponding to the feature area as the determination area. Thereafter, the processing proceeds to Step S204.

In Step S204, the feature point(s) in the determination area is extracted. The feature extraction unit 24 extracts the feature point(s) in the determination area extracted in Step S203. For example, the feature extraction unit 24 extracts the feature point(s) in the determination area by the method such as SIFT, SURF, or A-KAZE. Thereafter, the processing proceeds to Step S205.

In Step S205, it is determined whether the feature point is extracted in the determination area. In Step S204, the erectness determination unit 27 determines whether the feature point in the determination area is extracted by the feature extraction unit 24. In the case where it is determined that the feature point is not extracted, the erectness determination unit 27 does not perform the matching processing described later, and the processing proceeds to Step S214. On the other hand, in the case where it is determined that the feature point is extracted, the processing proceeds to Step S206.

In Step S206, the matching processing between the registered image and the determination target image is performed based on the extracted feature point and feature amount. The erectness determination unit 27 calculates the number of matching feature points between the two images based on the feature points and feature amounts in the registered image and the determination target image. In addition, the erectness determination unit 27 calculates (determines) the degree of similarity of the feature amount between the two images by comparing the feature amount of the feature point in the registered image (feature area) with the feature amount of the feature point in the determination target image (determination area). Note that the erectness determination unit 27 performs these matching processing by using brute-force or FLANN or the like. Thereafter, the processing proceeds to Step S207.

Note that, in Steps S207 to S219 described below, by dividing the degree of matching (the degree of similarity) between the registered image and the determination target image into a plurality of levels (four levels from Level 1 to Level 4) according to the number of matching feature points and the degree of similarity of the feature amount, it is determined whether the determination target image is erect, and the orientation of the determination target image is corrected. Note that the division of the degree of matching into levels is not limited to four levels, and the degree of matching may also be divided into a plurality of levels other than four levels.

In Step S207, it is determined whether the number of matching feature points X and the degree of similarity of the feature amount Y are not less than a predetermined threshold value X1 and a predetermined threshold value Y1, respectively. The erectness determination unit 27 determines whether, as the result of the matching processing in Step S206, the number of matching feature points X is not less than the predetermined threshold value X1 and the degree of similarity of the feature amount Y is not less than the predetermined threshold value Y1. In the case where X is not less than the predetermined threshold value X1 and Y is not less than the predetermined threshold value Y1 (Level 1), the processing proceeds to Step S208. On the other hand, in the case where the condition that X is not less than the predetermined threshold value X1 and Y is not less than the predetermined threshold value Y1 is not satisfied, the processing proceeds to Step S209.

In Step S208, the orientation of the determination target image is finalized. The erectness determination unit 27 finally determines the orientation (rotation angle) of the determination target image when it is determined that the number of matching feature points is particularly large and the degree of similarity of the feature amount is particularly high to be the orientation (rotation angle) of the determination target image with respect to the registered image. For example, in the case where, as the result of the matching processing between the determination target image having a rotation angle of 0 degrees and the registered image, the number of matching feature points and the degree of similarity of the feature amount exceed the predetermined threshold values (X1, Y1), it is determined that the determination target image is erect (a difference in angle between the determination target image and the registered image is 0 degrees). Thereafter, the processing proceeds to Step S215.

In Step S209, it is determined whether the number of matching feature points X and the degree of similarity of the feature amount Y are not less than a predetermined threshold value X2 and a predetermined threshold value Y2, respectively. The erectness determination unit 27 determines whether, as the result of the matching processing in Step S206, the number of matching feature points X is not less than the predetermined threshold value X2, and the degree of similarity of the feature amount Y is not less than the predetermined threshold value Y2. In the case where X is not less than the predetermined threshold value X2 and Y is not less than the predetermined threshold value Y2 (Level 2), the processing proceeds to Step S210. On the other hand, in the case where the condition that X is not less than the predetermined threshold value X2 and Y is not less than the predetermined threshold value Y2 is not satisfied, the processing proceeds to Step S211.

In Step S210, the number of votes based on the feature point and/or the feature amount is determined for the image orientation (rotation angle). For example, the erectness determination unit 27 determines the number of matching feature points to be the number of votes for the rotation angle in Step S202. For example, as shown in FIG. 5, in the case where the number of matching feature points between the determination target image having a rotation angle of 0 degrees and the registered image is six, the erectness determination unit 27 determines the number of votes for the rotation angle of 0 degrees to be 6. Thereafter, the processing proceeds to Step S214.

In Step S211, it is determined whether the number of matching feature points X and the degree of similarity of the feature amount Y are not less than a predetermined threshold value X3 and a predetermined threshold value Y3, respectively. The erectness determination unit 27 determines whether, as the result of the matching processing in Step S206, the number of matching feature points X is not less than the predetermined threshold value X3 and the degree of similarity of the feature amount Y is not less than the predetermined threshold value Y3. In the case where X is not less than the predetermined threshold value X3 and Y is not less than the predetermined threshold value Y3 (Level 3), the processing proceeds to Step S212. On the other hand, in the case where the condition that X is not less than the predetermined threshold value X3 and Y is not less than the predetermined threshold value Y3 is not satisfied (Level 4), the processing proceeds to Step S214. Note that, in the case of Level 4, it is determined that the feature corresponding to the determination feature in the registered image is not present in the determination target image, and the number of votes is not determined for the image orientation (rotation angle) in this case.

In Step S212, it is determined whether the determination is correct (whether the determination is the erroneous determination). The erectness determination unit 27 detects the erroneous determination based on the relative positions, each of which is a relative position between the feature points (the feature point in the registered image and the feature point in the determination target image) which match each other as the result of the matching processing in Step S206. For example, the erectness determination unit 27 calculates the confidence based on the variance value of the distance between the matching feature points and the variance value of the gradient of the line with which the matching points are connected, and determines whether the determination is the erroneous determination by comparing the confidence with the predetermined threshold value. In the case where it is determined that the determination is not the erroneous determination, the processing proceeds to Step S213. On the other hand, in the case where it is determined that the determination is the erroneous determination, the processing proceeds to Step S214. Note that, in the case where it is determined that the determination is the erroneous determination, the number of votes is not determined for the image orientation (rotation angle) in this case such that the orientation of the determination target image is not corrected to a wrong orientation by the erroneous determination.

In Step S213, the number of votes based on the feature point and/or the feature amount is determined for the image orientation (rotation angle). Note that processing in Step S213 is the same as the processing in Step S210, and hence the description thereof will be omitted. Thereafter, the processing proceeds to Step S214.

In Step S214, it is determined whether the rotation processing is completed for every angle of the determination target image which allows the outer edge shape of the determination target image to agree with the outer edge shape of the predetermined format image in the erect state.

The erectness determination unit 27 determines whether the rotation processing is completed for every angle which allows the outer edge shapes to agree with each other and, in the case where the rotation processing is not completed for every angle, the processing returns to Step S202 and, after the determination target image is rotated, the processing in Steps S203 to S213 is executed again. On the other hand, in the case where it is determined that the rotation processing is completed for every angle, the processing proceeds to Step S215.

In Step S215, it is determined whether the orientation of the determination target image is finalized. The erectness determination unit 27 determines whether the orientation of the determination target image is finalized by Step S208. In the case where the orientation is finalized, the processing proceeds to Step S216. On the other hand, in the case where the orientation is not finalized, the processing proceeds to Step S217.

In Step S216, the orientation of the determination target image is corrected. For example, when the erectness determination unit 27 determines that the determination target image is an image which is rotated clockwise by 90 degrees with respect to the registered image, the orientation correction unit 28 corrects the orientation to the erect orientation by rotating the determination target image counterclockwise by 90 degrees. Note that, in the case where it is determined that the orientation of the determination target image is erect (a difference in angle between the determination target image and the registered image is 0 degrees) in Step S208, the correction processing in Step S216 is not necessary. Thereafter, the processing shown in the present flowchart is ended.

In Step S217, it is determined whether the orientation for which the number of votes is determined is present. The erectness determination unit 27 determines whether the orientation for which the number of votes is determined by Step S210 or S213 is present. For example, in the examples in FIGS. 5 to 8, the number of votes is determined to be 6 in the case of the rotation angle of 0 degrees, the number of votes is determined to be 0 in the case of the rotation angle of 90 degrees, and the number of votes is determined to be 1 in the case of the rotation angle of 270 degrees and, accordingly, the erectness determination unit 27 determines that the orientation for which the number of votes is determined is present. In the case where the orientation for which the number of votes is determined is present, the processing proceeds to Step S218. On the other hand, in the case where the orientation for which the number of votes is determined is not present, the processing shown in the present flowchart is ended. Note that, in the case where the orientation for which the number of votes is determined is not present, i.e., in the case where the determination target image does not have the feature corresponding to the determination feature in the registered image and the erect orientation is not finalized, conventional erectness correction processing such as erectness correction using OCR may be performed.

In Step S218, the orientation of the determination target image is finalized based on the number of votes. The erectness determination unit 27 finally determines the orientation (rotation angle) having the highest number of votes to be the orientation of the determination target image. For example, in the examples in FIGS. 5 to 8, the number of votes in the case of the rotation angle of 0 degrees is highest, and hence the erectness determination unit 27 determines that the rotation angle of the determination target image with respect to the registered image is 0 degrees, i.e., the determination target image is erect. Thereafter, the processing proceeds to Step S219.

In Step S219, the orientation of the determination target image is corrected. Note that processing in Step S219 is the same as the processing in Step S216, and hence the description thereof will be omitted. Thereafter, the processing shown in the present flowchart is ended. Note that, in the case where the feature areas in a plurality of the predetermined format images are stored in the determination information storage unit 21, the erectness determination processing shown in FIGS. 15 and 16 is executed by using the individual feature areas sequentially until the image orientation of the determination target image is finalized (until the determination target image matches any one of the feature areas).

According to the system described in the present embodiment, it becomes possible to execute the image orientation determination by using the information on the feature area in the image having the predetermined format, and hence, even in the case where it becomes difficult to perform the orientation determination (accuracy is reduced) in the erectness determination using the conventional known recognition method, it becomes possible to increase the accuracy in the image orientation determination.

For example, in a known recognition method for characters (OCR or the like), in the case of a manuscript having a feature which reduces accuracy (with overlapping text and background, a large character, a bold character, a dot character, or a handwritten character or the like), or a manuscript having a feature which is difficult to recognize (the number of characters is small, vertical writing and horizontal writing are mixed, only other features such as the face of a person are present), it becomes difficult to perform the orientation determination. However, according to the system described in the present embodiment, it is possible to perform the orientation determination by using the information on the feature area in the image having the predetermined format, and hence, even in such a case, it becomes possible to increase the accuracy in the orientation determination. In addition, because of the same reason, it becomes possible to perform the orientation determination with high accuracy on the image which does not include an object for which the recognition method is established.

In addition, determination processing is often versatile in the known recognition method for characters (OCR or the like), and hence, in the case where extremely high accuracy (e.g., 100%) is intended such as the case of an operation worksite in which it is desired to reduce quality control (QC) steps, it is difficult to perform the determination with extremely high accuracy due to the presence of similar characters (e.g., the presence of characters which look alike when they are inverted) or the like. However, according to the system described in the present embodiment, it is possible to perform the erectness determination by using the information on the predetermined feature area in the image having the predetermined format, and hence it becomes possible for the user to easily customize the erectness determination processing at each scanning worksite. Consequently, according to the system described in the present embodiment, even in the case where extremely high accuracy is intended, it is possible to implement the orientation determination having extremely high accuracy by customizing the erectness determination processing.

In addition, on the manuscript having the same format as that of the registered image which is registered once in the determination information storage unit 21, the erectness determination and the orientation correction are automatically performed thereafter, and hence it is possible to maintain a state in which a visual erectness determination and manual orientation correction in QC steps are not necessary, and it becomes possible to achieve an increase in the efficiency of a scanning operation and an improvement in the productivity of an operator.

For example, when a large number of documents such as forms are converted into electronic form, by collectively placing manuscripts on a manuscript placement section of an auto document feeder (ADF) scanner, scanning is collectively performed. However, for lack of manpower or the like, it is difficult to perform adequate preprocessing (assortment of manuscripts and adjustment of orientations of manuscripts) at all worksites, and hence there are cases where scanning is performed in a state in which the orientations of the manuscripts placed on the manuscript placement section do not agree with each other. In these cases, document images having different orientations are output, and hence the operator needs to check the image orientation of each manuscript and perform a manual rotation operation of images having different orientations in QC steps. When the above situation frequently occurs, the frequent occurrence of the situation leads to a reduction in the productivity of the operator. Even in such a case, according to the system described in the present embodiment, it is possible to automatically perform the erectness determination by using the information on the feature area in the image having the predetermined format, and hence it becomes possible to achieve an increase in the efficiency of the scanning operation and an improvement in the productivity of the operator.

What is claimed is:

1. An information processing apparatus comprising:
a memory to store a determination feature in a predetermined partial area in a predetermined format image having a predetermined format and a position of the partial area in a state in which the predetermined format image is erect, the determination feature is information for determining similarity between an image included in the partial area and a comparison target image; and
a processor to determine whether a feature corresponding to the determination feature is present at a position in an input determination target image corresponding to the position of the partial area in the predetermined format image to thereby determine whether the determination target image is erect.

2. The information processing apparatus according to claim 1, wherein the processor further:
receives input of a learning image having the predetermined format; and
receives a specification of the partial area in the learning image, and wherein
the memory stores, as the determination feature and the position in the predetermined format image, a determination feature in the partial area of which the specification was received by the processor and a position of the partial area in the learning image in a state in which the learning image is erect.

3. The information processing apparatus according to claim 2, wherein the processor further extracts an area which is highly likely to be included in common in images having the predetermined format from the learning image in the erect state as a candidate for the partial area, and wherein
the processor receives a specification by a user who has referred to the extracted candidate.

4. The information processing apparatus according to claim 1, wherein the processor further rotates an image in a range of not less than 0 degrees and less than 360 degrees, and wherein
the processor performs the determination on the determination target image in a state in which the determination target image is rotated by the processor.

5. The information processing apparatus according to claim 4, wherein the processor:
rotates the determination target image by an at least one angle of one or more angles such that an outer edge shape of the determination target image agrees with an outer edge shape of the predetermined format image in an erect state, and
performs the determination on the determination target image in a state in which the determination target image is rotated by the at least one angle of the one or more angles.

6. The information processing apparatus according to claim 5, wherein the processor:
rotates, in a case where the predetermined format image is a rectangular image having a long side and a short side, the determination target image by an at least one angle of two angles such that a relationship between the long side or the short side and a longitudinal side or a transverse side agrees with a relationship of the predetermined format image in the erect state, and
performs the determination on the determination target image in a state in which the determination target image is rotated by the at least one angle of the two angles.

7. The information processing apparatus according to claim 1, wherein:
the memory stores the determination feature at a resolution adjusted in accordance with a size of the partial area, and
the processor determines whether the feature corresponding to the determination feature is present according to the resolution.

8. The information processing apparatus according to claim 1, wherein the processor uses an area obtained by adding a surrounding area to an area specified by a user as the partial area, and the memory stores the determination feature.

9. The information processing apparatus according to claim 8, wherein the processor adds, in a case where the surrounding area goes beyond an edge of the predetermined format image, a margin area corresponding to a portion beyond the edge as the surrounding area, and the memory stores the determination feature.

10. The information processing apparatus according to claim 1, wherein
the memory further stores a size of the predetermined format image, and
the processor determines whether, among input determination target images, a determination target image of which a size is equal or close to the size of the predetermined format image is erect.

11. The information processing apparatus according to claim 1, wherein the predetermined format image is an image of a document having a predetermined format.

12. The information processing apparatus according to claim 1, wherein the processor determines whether the feature corresponding to the determination feature is present in an area obtained by adding a peripheral area to an area at the position in the determination target image.

13. The information processing apparatus according to claim 1, wherein the determination feature includes an at least one feature point and an at least one feature amount, and wherein
   the processor determines whether the feature corresponding to the determination feature is present at the position in the determination target image by performing matching using the determination feature between the partial area in the predetermined format image and the area at the position in the determination target image.

14. The information processing apparatus according to claim 13, wherein, in a case where a plurality of feature points in the predetermined format image and a plurality of feature points in the determination target image match each other respectively as a result of the matching, the processor detects an erroneous determination based on relative positions, each of which is a relative position between one of the plurality of feature points in the predetermined format image and one of the plurality of feature points in the determination target image that match each other as a result of the matching.

15. The information processing apparatus according to claim 13, wherein the processor:
   calculates, by performing the matching, the number of matching feature points matched between the partial area and the area at the position in the determination target image and degree of similarity of the feature amount between the partial area and the area at the position in the determination target image; and
   determines whether the feature corresponding to the determination feature is present at the position in the determination target image by comparing the calculated number of the matching feature points with a predetermined threshold value and/or comparing the calculated degree of similarity with a predetermined threshold value.

16. The information processing apparatus according to claim 1, wherein
   the memory stores the determination feature in the partial area and the position of the partial area for a plurality of the predetermined format images, and
   the processor determines order of the predetermined format images used when an erectness determination of the determination target image is performed, based on an erectness determination result of an immediately preceding determination target image on which the erectness determination has been performed immediately before the determination target image.

17. An image orientation determination method for causing a computer to execute:
   storing a determination feature in a predetermined partial area in a predetermined format image having a predetermined format and a position of the partial area in a state in which the predetermined format image is erect, the determination feature is information for determining similarity between an image included in the partial area and a comparison target image; and
   determining whether a feature corresponding to the determination feature is present at a position in an input determination target image corresponding to the position of the partial area in the predetermined format image to thereby determine whether the determination target image is erect.

18. A non-transitory computer-readable recording medium on which is recorded a program for causing a computer to execute a process comprising:
   storing a determination feature in a predetermined partial area in a predetermined format image having a predetermined format and a position of the partial area in a state in which the predetermined format image is erect, the determination feature is information for determining similarity between an image included in the partial area and a comparison target image; and
   determining whether a feature corresponding to the determination feature is present at a position in an input determination target image corresponding to the position of the partial area in the predetermined format image to thereby determine whether the determination target image is erect.

\* \* \* \* \*